United States Patent
Sato

(10) Patent No.: US 10,293,394 B2
(45) Date of Patent: May 21, 2019

(54) SHEET MATERIAL BENDING SYSTEM

(71) Applicant: AMADA COMPANY, LIMITED, Kanagawa (JP)

(72) Inventor: Masaaki Sato, Kanagawa (JP)

(73) Assignee: AMADA COMPANY, LIMITED, Kanagawa-Ken (JP)

( * ) Notice: Subject to any disclaimer, the term of this patent is extended or adjusted under 35 U.S.C. 154(b) by 0 days.

(21) Appl. No.: 15/950,801

(22) Filed: Apr. 11, 2018

(65) Prior Publication Data

US 2018/0229286 A1  Aug. 16, 2018

Related U.S. Application Data

(62) Division of application No. 14/434,991, filed as application No. PCT/JP2013/078284 on Oct. 18, 2013.

(30) Foreign Application Priority Data

Oct. 19, 2012 (JP) ................................ 2012-231422

(51) Int. Cl.
*B23Q 3/155* (2006.01)
*B25J 9/00* (2006.01)
(Continued)

(52) U.S. Cl.
CPC ......... *B21D 5/0254* (2013.01); *B21D 5/0236* (2013.01); *B21D 37/147* (2013.01);
(Continued)

(58) Field of Classification Search
CPC . B21D 37/145; B21D 55/00; Y10T 483/1729; Y10T 483/1731; Y10T 483/115;
(Continued)

(56) References Cited

U.S. PATENT DOCUMENTS 4,878,288 A  11/1989 Messner
4,916,951 A   4/1990 Messner
(Continued)

FOREIGN PATENT DOCUMENTS

AT  509708  11/2011
AT  511078   9/2012
(Continued)

OTHER PUBLICATIONS

Co-pending U.S. Appl. No. 14/434,991 to Masaaki Sato, filed Apr. 10, 2015.
(Continued)

*Primary Examiner* — Erica E Cadugan
(74) *Attorney, Agent, or Firm* — Greenblum & Bernstein, P.L.C.

(57) ABSTRACT

A sheet material bending system includes a tool changing apparatus that changes tools between a press brake and a tool stocker. The tool stocker is arranged behind the press brake. To change tools from the front and rear of the tool stocker, the front and rear of the tool stocker are opened. The tool changing apparatus has a pivot that is movable in front-rear, left-right, and up-down directions and is rotatable around an axis extending in the up-down direction. A front end of the pivot is provided with tool holding units to hold tools.

1 Claim, 20 Drawing Sheets

(51) Int. Cl.
    *B21D 5/02* (2006.01)
    *B21D 55/00* (2006.01)
    *B23Q 11/08* (2006.01)
    *B21D 37/14* (2006.01)
    *B30B 15/02* (2006.01)

(52) U.S. Cl.
    CPC ......... *B21D 55/00* (2013.01); *B23Q 3/15573* (2013.01); *B23Q 11/08* (2013.01); *B25J 9/0018* (2013.01); *B30B 15/026* (2013.01); *B30B 15/028* (2013.01); *B23Q 3/15533* (2013.01); *Y10T 483/115* (2015.01); *Y10T 483/1729* (2015.01); *Y10T 483/1731* (2015.01)

(58) Field of Classification Search
    CPC . B23Q 3/15533; B23Q 3/155–3/15793; B23Q 11/08–11/0891; B25J 9/0018
    USPC .................................................. 483/28–29, 3
    See application file for complete search history.

(56) References Cited

U.S. PATENT DOCUMENTS

| | | |
|---|---|---|
| 2007/0271987 A1 | 11/2007 | Shimizu et al. |
| 2013/0203572 A1 | 8/2013 | Denkmeier |
| 2016/0067840 A1* | 3/2016 | Fujimoto ............. B23Q 3/1554 483/58 |

FOREIGN PATENT DOCUMENTS

| | | |
|---|---|---|
| CH | 668035 | 11/1988 |
| DE | 10236342 | 2/2004 |
| EP | 1658908 | 5/2006 |
| JP | 52-156164 | 12/1977 |
| JP | 55-177924 U1 | 6/1979 |
| JP | 59-73021 | 5/1984 |
| JP | 05/084520 | 4/1993 |
| JP | 05-084414 | 11/1993 |
| JP | 06-7851 | 1/1994 |
| JP | 07-275941 | 10/1995 |
| JP | 2000-71028 | 3/2000 |
| JP | 2001-150032 | 6/2001 |
| JP | 2003-136144 | 5/2003 |
| JP | 2015-120182 | 7/2015 |
| WO | 00/41824 | 7/2000 |
| WO | 2012/027770 | 3/2012 |

OTHER PUBLICATIONS

Search report from International Bureau of WIPO, Application No. PCT/JP2013/078284, dated Jan. 21, 2014.
Search Report issued by European Patent Office (EPO) patent office in European Patent Office (EPO) Patent Application No. 13848044.7, dated Jun. 14, 2016.
Derwent English language abstract of CH 668035 A5, which CH '035 was published Nov. 1988.
Machine Translation of AT 51 1078 A4, which AT '078 was published Sep. 2012.
Japan Official Action received in JP Patent Application No. 2018-100334, dated Mar. 11, 2019.

* cited by examiner

SHEET MATERIAL BENDING SYSTEM

CROSS-REFERENCE TO RELATED APPLICATIONS

This is a divisional application of pending U.S. patent application Ser. No. 14/434,991, filed on Apr. 10, 2015, which is a U.S. National Stage Application of International Application PCT/JP2013/078284, filed Oct. 18, 2013, which claims priority to Japan Application No. 2012-231422, filed Oct. 19, 2012. The disclosures of these documents, including the specifications, drawings and claims, are incorporated herein by reference in their entirety.

TECHNICAL FIELD

The present invention relates to a sheet material bending system including a press brake that has an upper table at front upper part of left and right side frames and a lower table at front lower part thereof, one of the upper and lower tables serving as a ram movable up and down, a tool stocker that detachably and changeably stores a plurality of upper and lower tools to be attached, detached, and changed with respect to the press brake, and a tool changing apparatus that changes tools between the press brake and the tool stocker. The present invention particularly relates to a sheet material processing system that arranges the tool stocker on the rear side of the press brake to simplify an overall construction of the system and save space.

BACKGROUND ART

Various prior arts have been developed in connection with a sheet material bending system that includes a press brake, a tool stocker to detachably store a plurality of upper and lower tools, and a tool changing apparatus (an automatic tool changer (ATC)) to automatically change tools between the press brake and the tool stocker. A sheet material bending system according to one related art arranges a tool stocker on the left or right side of a press brake and employs a tool changing apparatus to change a tool with another. Another related art arranges a tool stocker on one side of or in front of a press brake and employs, for example, an industrial robot as a tool changing apparatus to change a tool with another.

These related arts need an increased area for the system as a whole. To save space, a sheet material bending system according to another related art arranges a tool stocker and a tool changing apparatus behind upper and lower tables and between left and right side frames of a press brake. Patent literatures disclosing the related arts are, for example, Japanese Unexamined Patent Application Publications No. S52-156164 (Patent Literature 1), No. H05-84520 (Patent Literature 2), No. H07-275941 (Patent Literature 3), and No. 2003-136144 (Patent Literature 4) and Published PCT International Application No. WO00/41824 (Patent Literature 5).

SUMMARY OF INVENTION

Problems to be Solved by Invention

Inventions described in Patent Literatures 1 to 4 aim to handle tools that are long in a left-right direction. Accordingly, configurations described in Patent Literatures 1 to 4 hardly handle split tools.

A configuration described in Patent Literature 5 aims to change split tools and is configured as illustrated in FIG. 1.

Namely, a press brake 1 has an upper table 5 at front upper part of left and right side frames 3L and 3R and a lower table 7 at front lower part of the left and right side frames 3L and 3R, the lower table 7 facing the upper table 5. A proper one of the upper table 5 and lower table 7 serves as a ram that is movable up and down.

Arranged at lower part of the upper table 5 is an upper-tool attaching unit 9 to which an upper tool (punch) P is detachably attached. The upper-tool attaching unit 9 has a tool attaching groove 11 to which the punch P is detachably and changeably attached and which is long in a left-right direction (an X-axis direction, i.e., a direction orthogonal to the plane of FIG. 1). Arranged at upper part of the lower table 7 is a lower-tool attaching unit 13 to which a lower tool (die) D is detachably attached. The lower-tool attaching unit 13 has a tool attaching groove 11 to which the die D is detachably and changeably attached and which is long in the left-right direction.

The tool attaching groove 11 provided for the upper-tool attaching unit 9 on the upper table 5 and the tool attaching groove 11 provided for the lower-tool attaching unit 13 are symmetrical with each other in an up-down direction. Namely, the punch P may be turned upside down and attached to the lower-tool attaching unit 13 and the die D may be turned upside down and attached to the upper-tool attaching unit 9.

The press brake 1 also has a back gauge 15 with which part of a sheet work W is brought into contact to position the sheet work W in a front-rear direction (a Y-axis direction) when bending the sheet work W with the punch P and die D. The back gauge 15 is moved and positioned in the front-rear direction.

As illustrated in FIG. 2, the tool attaching groove 11 of the upper-tool attaching unit 9 has front wall face 17A and a rear wall face 17B that are each provided with a stop groove 21 to receive a stop piece 19 provided for the punch P. The stop groove elongates in the left-right direction. The punch P has an attaching part 23 that is detachably attached to the tool attaching groove 11. Each of front and rear faces (in terms of the Y-axis direction) of the attaching part 23 has a V-shaped fixing groove 25 extending in the left-right direction. Formed below the fixing grooves 25 is a recess 27 that receives the stop piece 19.

The stop piece 19 is always pushed with an internally arranged resilient member (not illustrated) such as a coil spring so that the stop piece 19 may protrude out of the recess. Namely, the stop piece 19 is arranged to be able to protrude and retract with respect to the surface of the attaching part 23 of the punch P. Upper part of the stop piece 19 has a beak-shaped stop projection 19A that engages and disengages with respect to the stop groove 21. Lower part of the stop piece 19 has a push button 19B to be pushed against the pressing force of the resilient member. Under the stop piece 19, the attaching part 23 has a through hole 29 in the front-rear direction.

The attaching part 23 of the punch P is attached to the tool attaching groove 11 of the upper-tool attaching unit 9. Thereafter, the attaching part 23 is pressed and fixed. For this, the upper-tool attaching unit 9 has a pressing-fixing piece 31 that is engageable with the fixing groove 25 of the punch P and is able to protrude and retract with respect to the rear wall face 17B of the tool attaching groove 11. The pressing-fixing piece 31 is moved in the front-rear direction by an actuator 33 such as a fluid pressure cylinder.

The attaching part 23 of the punch P is attached to the tool attaching groove 11 and the stop projection 19A of the stop piece 19 provided for the attaching part 23 is fitted into the stop groove 21. The pressing-fixing piece 31 is kept in a loosened state, so that the punch P is movable in the left-right direction relative to the upper-tool attaching unit 9 without dropping. When the push button 19B of the stop piece 19 is pushed against the pressing force and the stop projection 19A is removed out of the stop groove 21, the punch P is detachable downward from the upper-tool attaching unit 9. This realizes the detaching and changing of the punch P with respect to the upper-tool attaching unit 9. The attaching part of the die D with respect to the lower-tool attaching unit 13 is similarly configured, and therefore, is similarly detachable and changeable with respect to the lower-tool attaching unit 13.

In the press brake 1, an upper-tool storing unit 33 stores a punch P to be attached to the upper-tool attaching unit 9 or to be changed with an already attached one. As illustrated in FIG. 1, the upper-tool storing unit 33 is arranged in the vicinity of the back of the upper table 5 and is movable in the up-down direction. A lower-tool storing unit 35 stores a die D to be attached to the lower-tool attaching unit 13 or to be changed with an already attached one. The lower-tool storing unit 35 is arranged in the vicinity of the back of the lower table 7 and is movable in the up-down direction. To attach, detach, or change the punch (upper tool) P between the upper-tool attaching unit 9 and the upper-tool storing unit 33, there is arranged an upper-tool changing apparatus 37U. To attach, detach, or change the die (lower tool) D between the lower-tool attaching unit 13 and the lower-tool storing unit 35, there is arranged a lower-tool changing apparatus 37L.

The upper-tool changing apparatus 37U and lower-tool changing apparatus 37L are substantially symmetrical with each other in the up-down direction, and therefore, a configuration of the upper-tool changing apparatus 37U will be explained. Structural elements of the lower-tool changing apparatus 37L whose functions are similar to those of the upper-tool changing apparatus 37U are represented with like reference marks to omit the explanation of the structure of the lower-tool changing apparatus 37L.

As illustrated in FIG. 3, the upper-tool changing apparatus 37U is so constituted to be able to move (transfer) the punch P in the X-axis direction (left-right direction), Y-axis direction (front-rear direction), and Z-axis direction (up-down direction). Under the upper table 5, a base plate 39 extends in the left-right direction. On the rear side of the base plate 39, a guide member 41 and rack 43 elongate in the left-right direction. The guide member 41 guides and supports a left-right slider 45 that is movable in the X-axis direction (left-right direction). The rack 43 engages with a pinion 47 turned by a servomotor (not illustrated) installed on the left-right slider 45. Controlling the rotation of the servomotor results in moving and positioning the left-right slider 45 in the left-right direction.

The left-right slider 45 has an up-down guide member 49 that guides an up-down slider 51 in the up-down direction. The up-down slider 51 is moved up and down by an up-down actuator (not illustrated) such as a fluid pressure cylinder. The up-down slider 51 has a front-rear guide member 53 that guides and supports a front-rear slider 55 to be movable in the front-rear direction. The front-rear slider 55 is moved in the front-rear direction by a front-rear actuator 57 such as a fluid pressure cylinder installed on the up-down slider 51.

The front-rear slider 55 has a hook support member 59 that is movable in the front-rear direction relative to the front-rear slider 55. The hook support member 59 is moved in the front-rear direction by a front-rear actuator 61 such as a fluid pressure cylinder installed on the front-rear slider 55. A front end 59A of the hook support member 59 is formed to enter into the through hole 29 of the punch P. The hook support member 59 has an upward projection 59B that comes into contact with the punch P when the front end 59A is inserted into the through hole 29 of the punch P.

A top face of the hook support member 59 supports a hook attaching member 63 so that the hook attaching member 63 is movable in the front-rear direction. The hook attaching member 63 is moved in the front-rear direction by a front-rear actuator 65 installed on the front-rear slider 55. A front end of the hook attaching member 63 supports through a pivot 67 a hook member 69 so that the hook member 69 pivots up and down. The hook member 69 is able to pass through the through hole 29 of the punch P. A front end of the hook member 69 has an upward projection 69A that is able to pass through the through hole 29 and press the push button 19B of the stop piece 19.

Between a spring seat 71 arranged on a top face of the hook attaching member 63 and a base end of the hook member 69, a resilient member 73 such as a coil spring is arranged. This biases the hook member 69 in a clockwise direction in FIG. 3 so that, in a normal state, the upward projection 69A of the hook member 69 is in a descended state. When the hook support member 59 is moved rightward relative to the hook member 69 in FIG. 3, the hook member 69 turns in a counterclockwise direction against the pushing force of the resilient member 73.

With the above-mentioned arrangement, the hook member 69 in FIG. 3 is positioned to correspond to the through hole 29 of the punch P attached to the upper-tool attaching unit 9. When the front-rear slider 55 is moved toward the punch P, the hook member 69 enters into the through hole 29 of the punch P as illustrated in FIG. 2. Thereafter, if the hook support member 59 is moved in the same direction relative to the hook member 69, the hook member 69 turns upward and the upward projection 59B of the hook support member 59 comes into contact with the punch P.

Thereafter, the front-rear actuator 65 operates to pull the hook member 69, so that the upward projection 69A of the hook member 69 presses the push button 19B of the stop piece 19. As a result, the stop projection 19A of the stop piece 19 moves out of the stop groove 21 of the tool attaching groove 11 of the upper-tool attaching unit 9, so that the punch P becomes removable in a downward direction. Thereafter, the up-down slider 51 is lowered to remove the punch P downward from the upper-tool attaching unit 9 with the punch P being held by the hook member 69.

As is already understood, the upper-tool changing apparatus 37U enables the punch P to be attached to and detached from the upper-tool attaching unit 9, i.e., to be attached, detached, and changed between the upper-tool storing unit 33 and the upper-tool attaching unit 9. Similarly, the lower-tool changing apparatus 37L enables the die D to be attached, detached, and changed between the lower-tool storing unit 35 and the lower-tool attaching unit 13.

According to the above-mentioned configuration, the punch P is attached, detached, and changed by inserting the hook member 69 into the through hole 29 of the punch P, and therefore, the punch P never drops to improve safety. Since the upper-tool changing apparatus 37U is movable in the X-, Y-, and Z-axis directions, the punch P may be a split tool.

According to the above-mentioned configuration, the upper-dire storing unit 33 is arranged in the vicinity of the back of the upper table 5 and the lower-tool storing unit 35 in the vicinity of the back of the lower table 7. The upper-tool changing apparatus 37U for changing the upper tool (punch) P and the lower-tool changing apparatus 37L for changing the die D are arranged between a processing position where a work W is bent with the punch P and die D and a position where the back gauge 15 positions the work W.

Accordingly, it is difficult to manually attach, detach, or change a new punch P and new die D with respect to the upper-tool storing unit 33 and lower-tool storing unit 35. During the bending process of the work W, it is impossible to attach, detach, or change a new punch P and new die D with respect to the upper-tool storing unit 33 and lower tool storing unit 35. A further improvement is required, therefore, for the preparation of upper and lower tools to be used for the next bending process.

To avoid an interference between the back gauge 15 and the upper-tool changing apparatus 37U and lower-tool changing apparatus 37L, the upper- and lower-tool changing apparatuses 37U and 37L must be retracted outside the left and right side frames of the press brake. Accordingly, a further improvement is required to simplify the system as a whole and save space.

Means to Solve Problems

In consideration of the above-mentioned problems, the present invention provides a sheet material bending system including a press brake that has an upper table at front upper part of left and right side frames and a lower table at front lower part thereof, a tool stocker that detachably stores a plurality of upper and lower tools to be attached, detached, and changed with respect to the press brake, and a tool changing apparatus that changes tools between the press brake and the tool stocker. The sheet material bending system of the present invention arranges the tool stocker behind the press brake and opens front and rear sides of the tool stocker so that tools are changed from the front and rear sides with respect to the tool stocker. The tool changing apparatus has a pivot that is movable in front-rear, left-right, and up-down directions and is rotatable around an axis extending in the up-down direction. A front end of the pivot is provided with a tool holding unit to hold a tool.

MODE OF IMPLEMENTING INVENTION

A sheet material bending system according to an embodiment of the present invention will be explained with reference to the drawings. Structural elements whose effects are similar to those of the related art explained above are represented with like reference marks to omit overlapping explanations.

Figure 1:
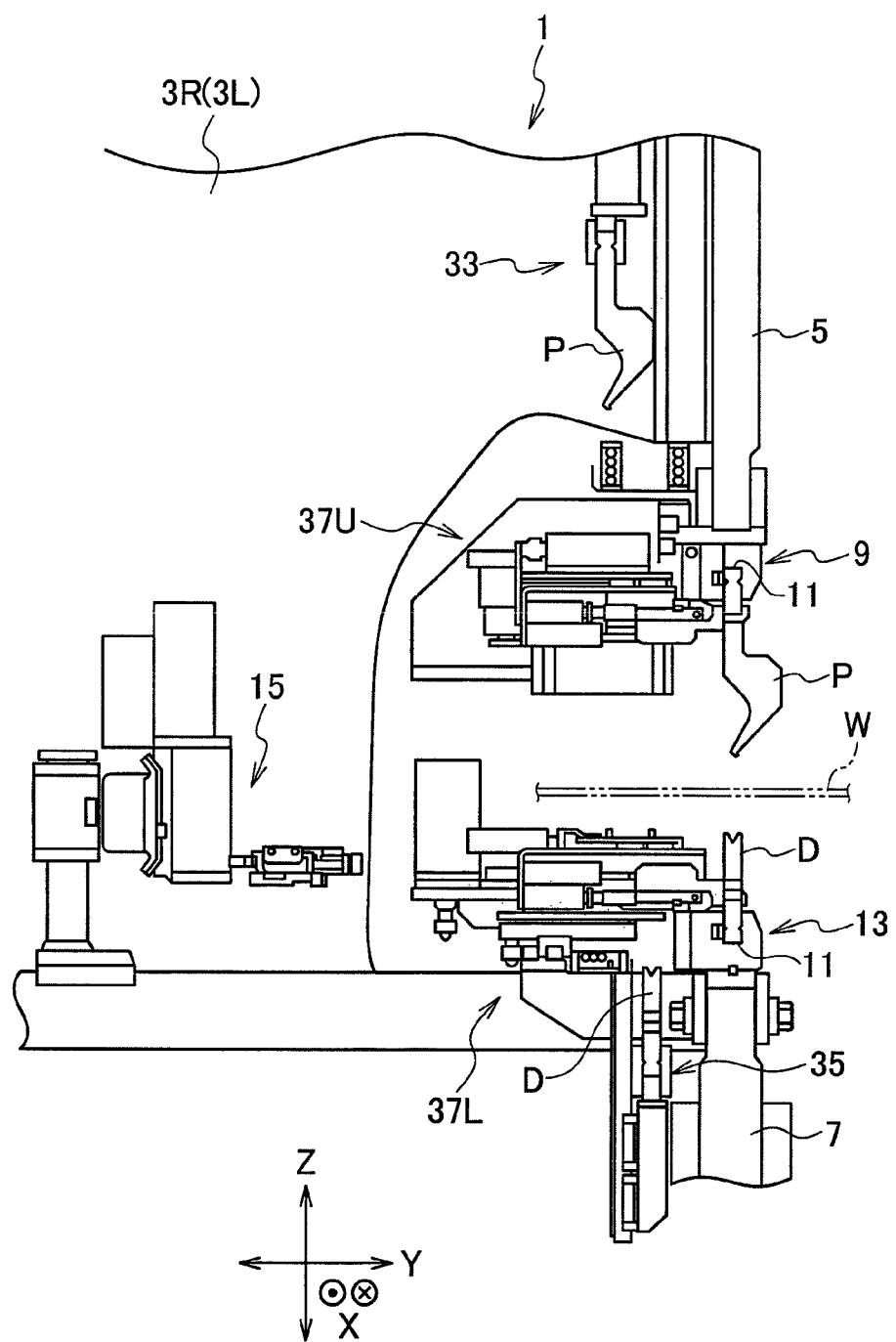
FIG. 1 is an explanatory side view illustrating a main structure of a press brake in a sheet material bending system according to a related art.
Figure 2:
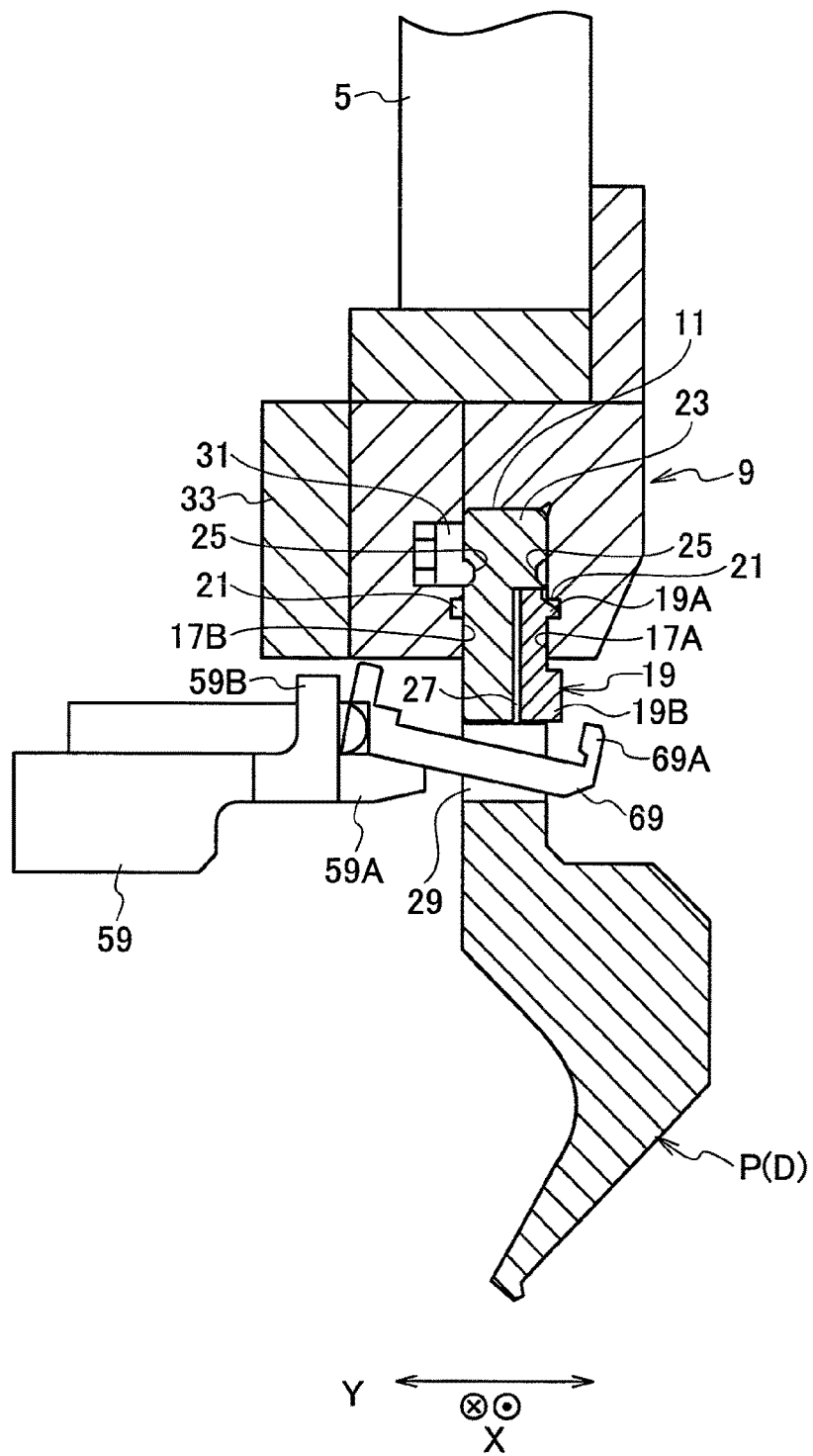
FIG. 2 is an explanatory view illustrating changing a tool of the press brake in the sheet material bending system according to the related art.
Figure 3:
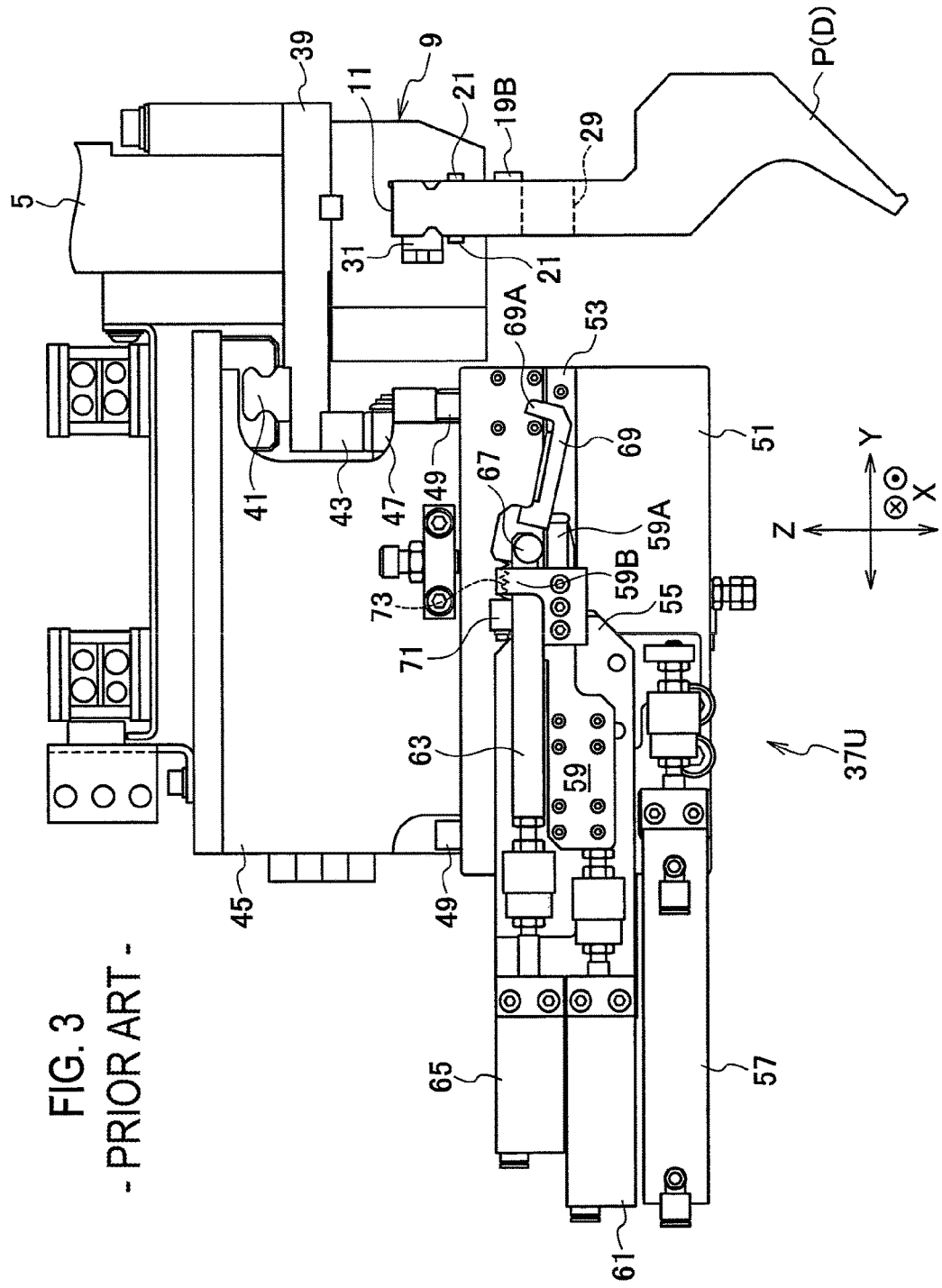
FIG. 3 is an explanatory view illustrating a tool changing apparatus of the press brake in the sheet material bending system according to the related art.
Figure 4:
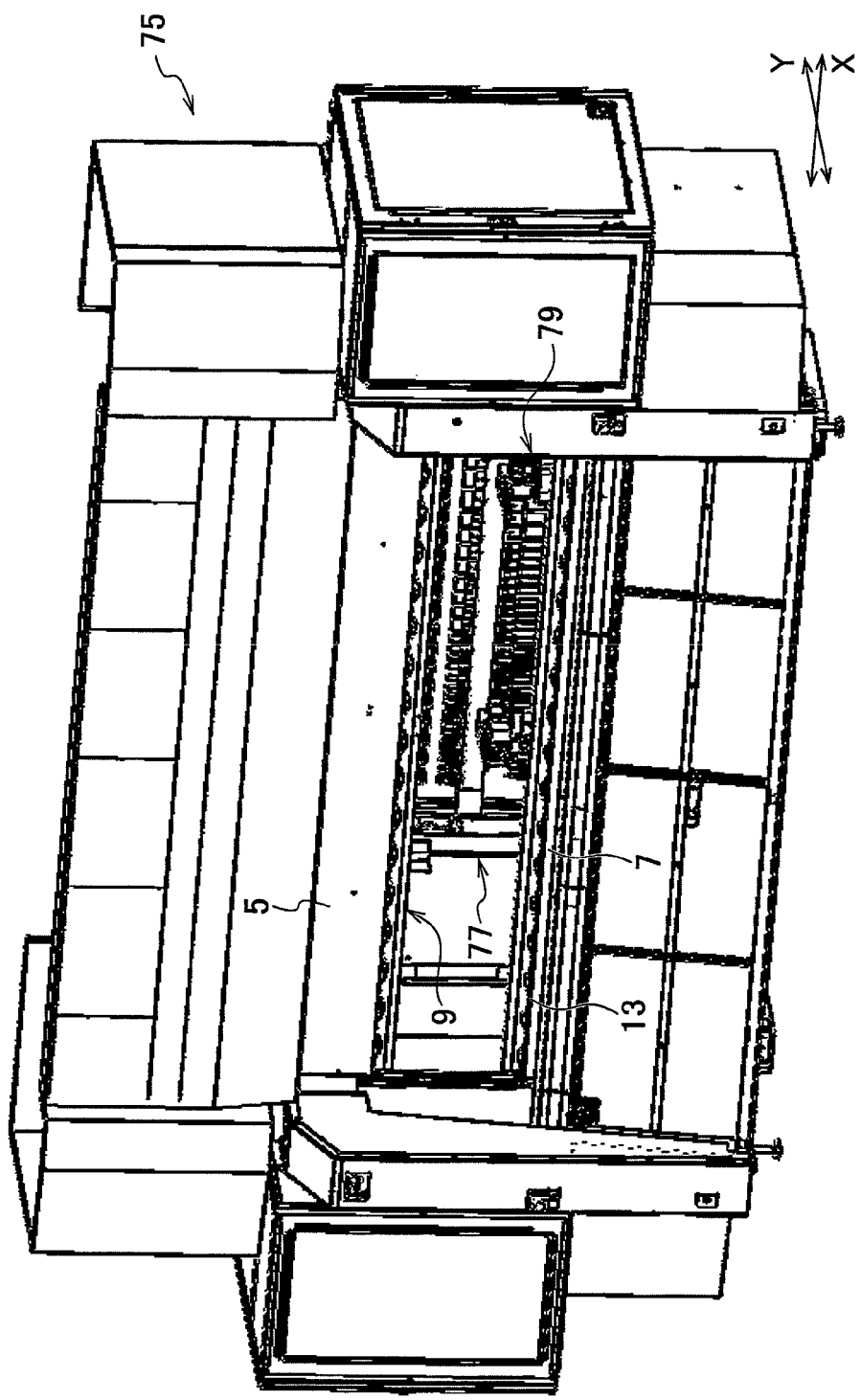
FIG. 4 is an explanatory perspective view schematically illustrating a general structure of a sheet material bending system according to an embodiment of the present invention.
Figure 5:
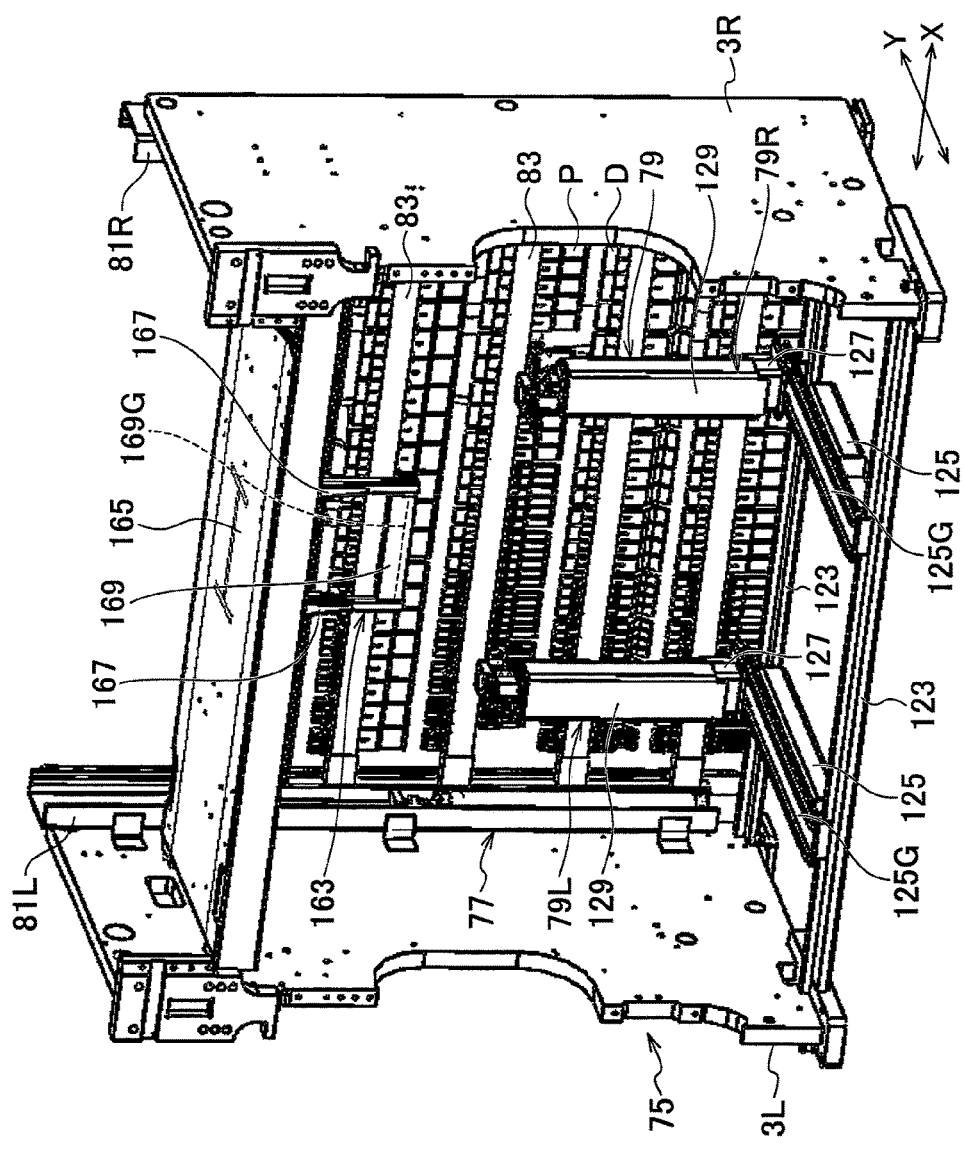
FIG. 5 is an explanatory perspective view schematically illustrating essential part of the sheet material bending system with upper and lower tables of a press brake in the system being omitted.

Referring to FIGS. 4 and 5, the sheet material bending system according to an embodiment of the present invention includes a press brake 75 that carries out a bending process on a sheet work, a tool stocker 77 that stores a plurality of upper and lower tools (punches P and dies D) to be attached, detached, and changed with respect to the press brake 75, and a tool changing apparatus 79 that changes the punches P and dies D between the press brake 75 and the tool stocker 77.

The press brake 75 has a structure similar to that of the press brake of the related art mentioned above and includes left and right side frames 3L and 3R. Arranged at front upper part of the left and right side frames 3L and 3R is an upper table 5 that is movable upward and downward. Arranged at front lower part of the left and right side frames 3L and 3R is a lower table 7. Arranged at lower part of the upper table 5 is an upper-tool attaching unit 9 that attaches, detaches, and changes the punch P. Arranged at upper part of the lower table 7 is a lower-tool attaching unit 13 that attaches, detaches, and changes the die D.

For the sake of easy understanding of a general structure, FIG. 5 omits the upper and lower tables 5 and 7. A general basic structure of the press brake 75 is the same as that of the press brake 1 according to the related art explained above, and therefore, the details of the structure of the press brake 75 will not be explained.

Figure 6:
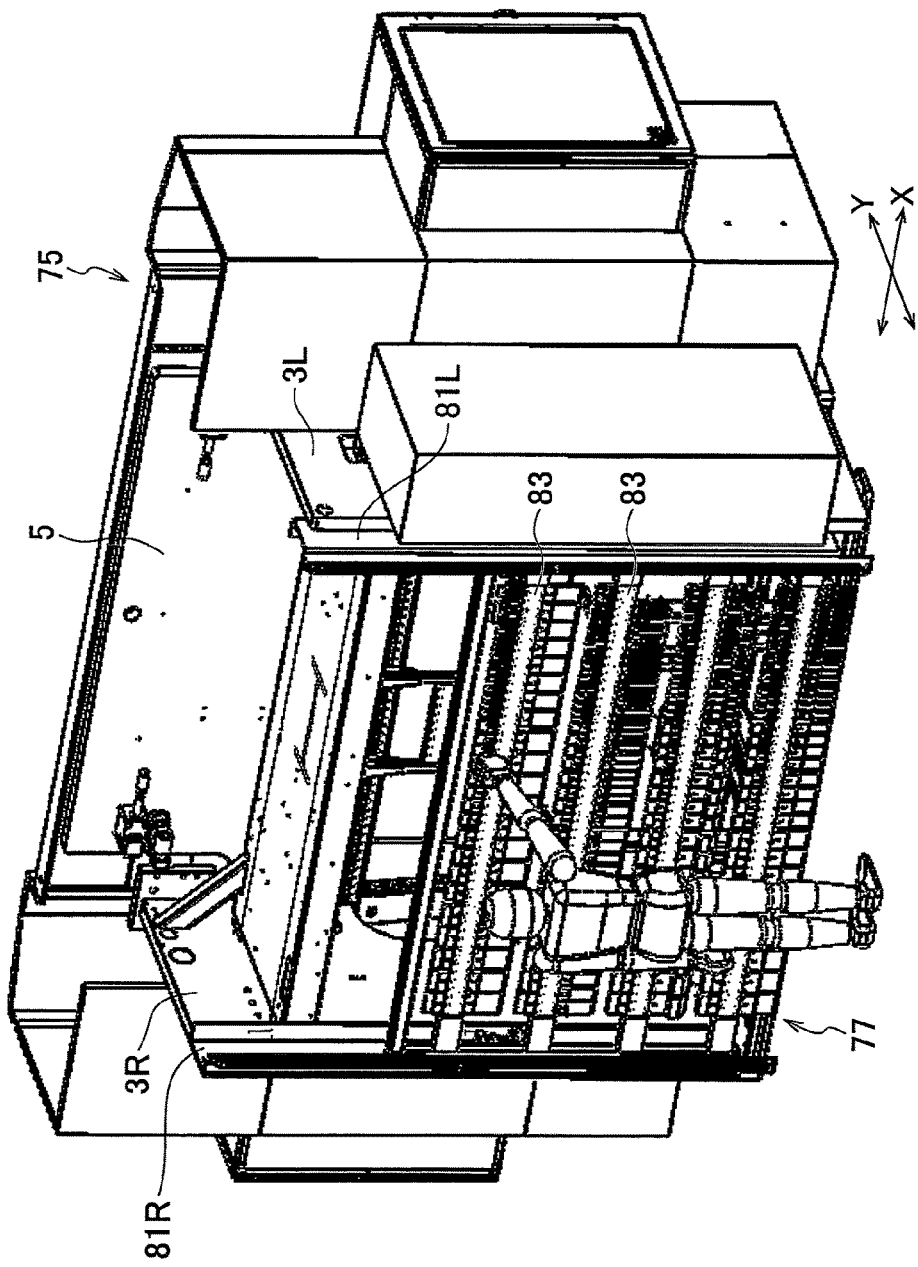
FIG. 6 is an explanatory perspective back view illustrating the sheet material bending system.

The tool stocker 77 is arranged behind the press brake 75. As illustrated in FIGS. 5 and 6, a pair of left and right guide supports 81L and 81R extending in the up-down direction are arranged at rear part of inner side faces of the left and right side frames 3L and 3R in the press brake 75. The left and right guide supports 81L and 81R have a plurality of tool support beams 83 that are movable up and down and detachably support a plurality of punches P and dies D.

Figure 7:
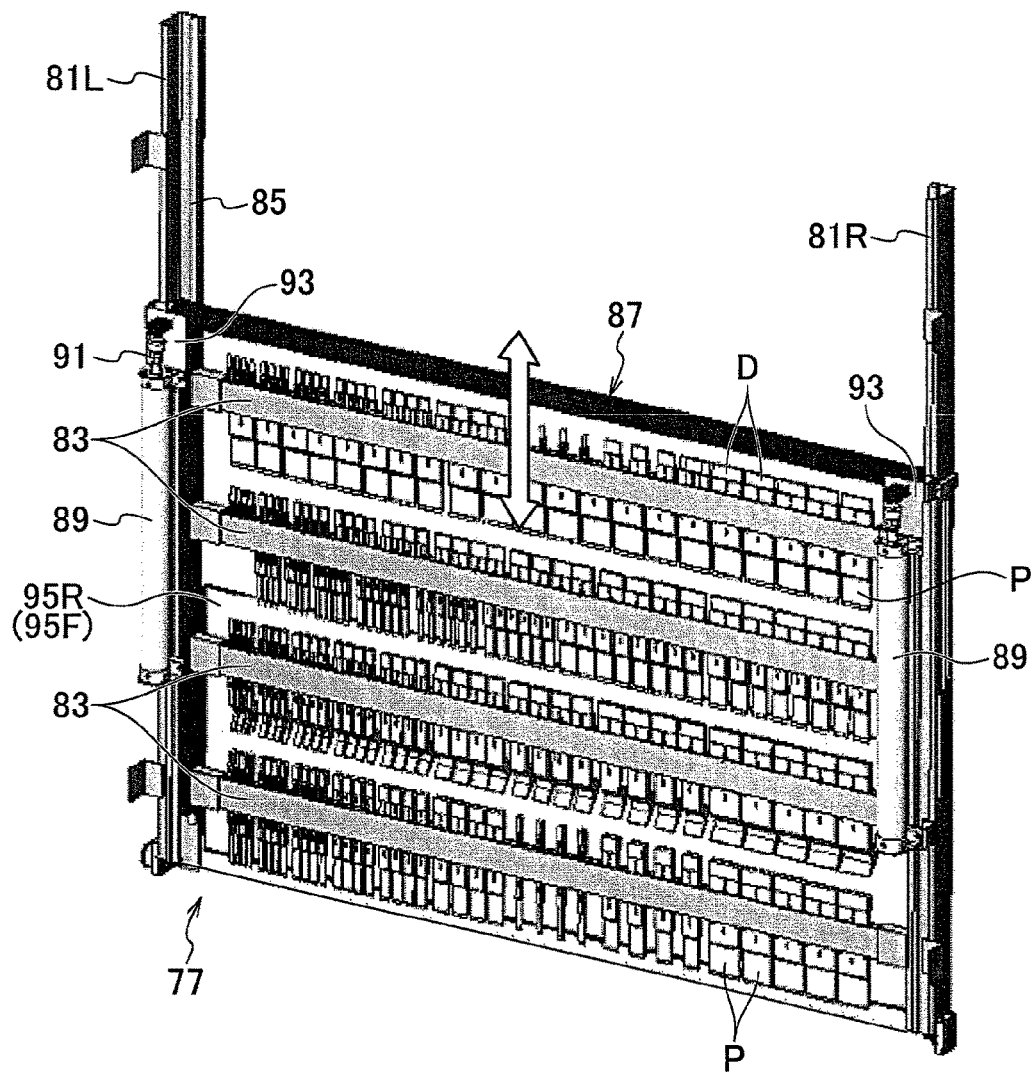
FIG. 7 is an explanatory perspective view illustrating a general structure of a tool stocker.

More precisely, as illustrated in FIG. 7, the guide supports 81L and 81R arranged at rear part of the inner side faces of the left and right side frames 3L and 3R have guide rails 85, respectively. The guide rails 85 support left and right sides of a frame 87 so that the frame 87 is movable up and down. The frame 87 supports the tool support beams 83 that are arranged in steps and horizontally extend in the left-right direction. On a top face of each of the tool support beams 83, there is formed a tool attaching groove 11 that elongates in the left-right direction to attach thereto and detach therefrom a plurality of dies D. On a bottom face of each of the tool support beams 83, there is formed a tool attaching groove 11 (refer to FIG. 8) that elongates in the left-right direction to attach thereto and detach therefrom a plurality of punches P.

The tool attaching grooves 11 formed on the top and bottom faces of each of the tool support beams 83 have the same configuration as the tool attaching grooves 11 of the upper-tool attaching unit 9 according to the above-mentioned related art. The tool support beams 83 are satisfactory if they are able to support the punches P and dies D without dropping them, and therefore, the pressing-fixing pieces 31 mentioned above are omitted.

To move the frame 87 up and down, the guide supports 81L and 81R are provided with an up-down actuator 89 (refer to FIG. 7) such as a fluid pressure cylinder. In the up-down actuator 89, an up-down acting element 91 such as a piston rod that moves up and down and a connection bracket 93 integral with the frame 87 are connected together. When the up-down actuator 89 is activated, the frame 87 is moved up and down, to position a required one of the tool support beam 83 at a given height.

In the tool stocker 77, lower front part and lower rear part of the left and right guide supports 81L and 81R are integrally provided with front and rear covers 95F and 95R (refer to FIGS. 8 and 9) to cover lower part of an area in which the frame 87 moves up and down. In other words, upper part of the area in which the frame 87 moves up and down is not covered with the covers 95F and 95R and is open to the front and rear sides. To improve safety, front and rear shutters 97F and 97R are arranged to be movable up and down to open and close the front and rear sides of the upper part of the area in which the frame 87 moves up and down.

Figure 8:
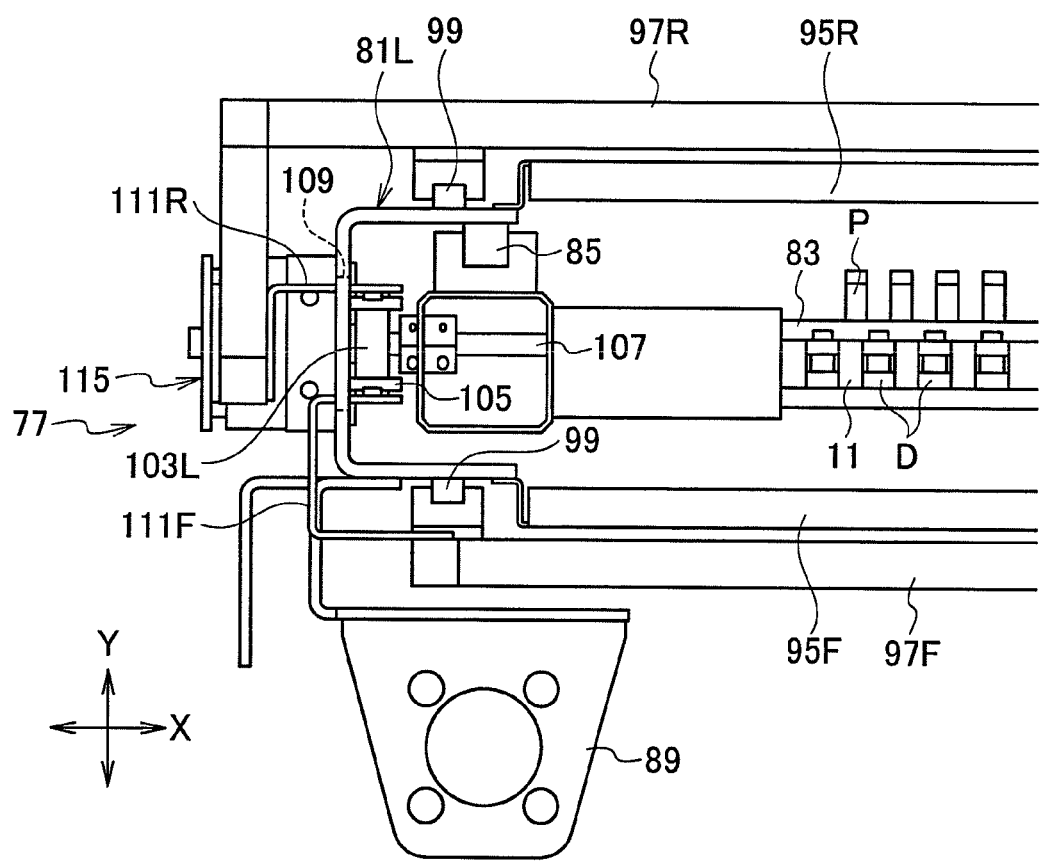
FIG. 8 is an explanatory sectional plan view illustrating essential part of the tool stocker.
Figure 9:
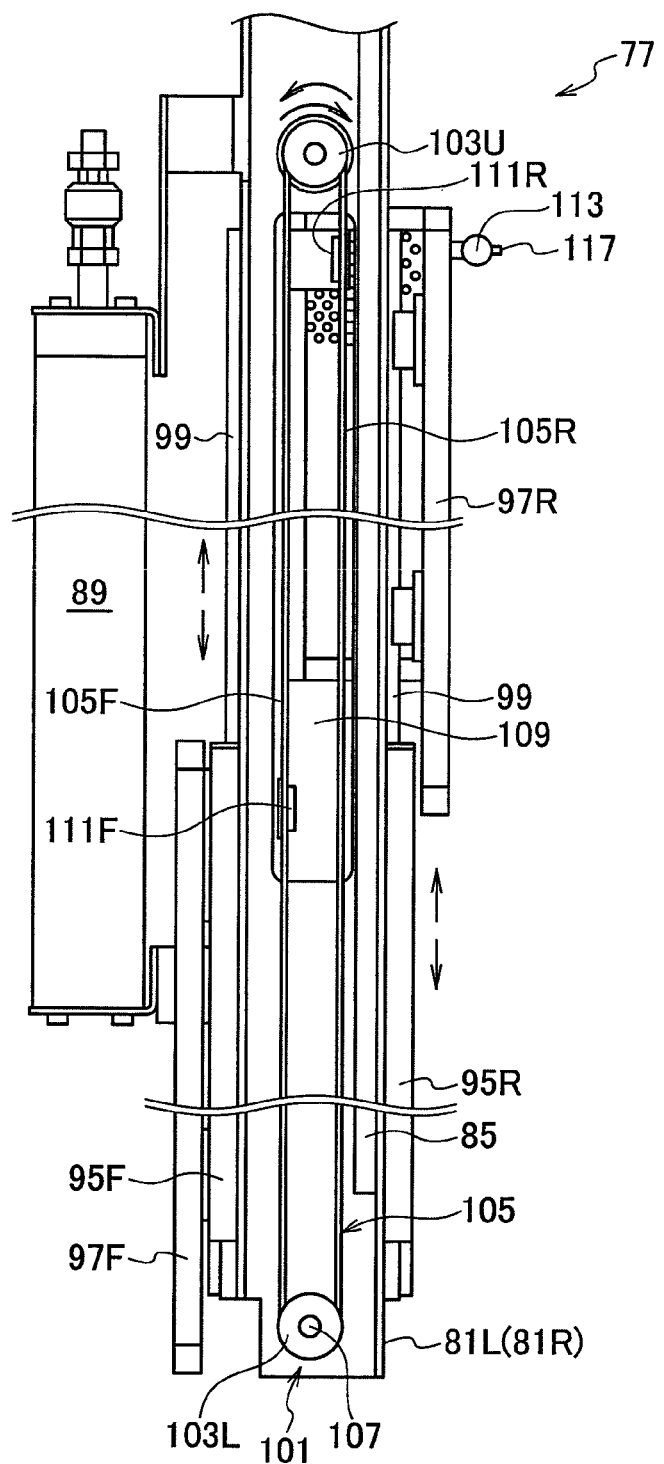
FIG. 9 is an explanatory sectional side view illustrating essential part of the tool stocker.

In more detail, as illustrated in FIGS. 8 and 9, the left and right guide supports 81L and 81R have, on their front and rear faces, guide members 99 extending in the up-down direction. The guide members 99 guide and support the left and right sides of the front and rear shutters 97F and 97R so that the shutters are movable up and down. The front and rear shutters 97F and 97R are interlocked so that, when one of the shutters 97F and 97R is moved up to close the upper side of the front cover 95F, the other of the shutters 97R and 97F descends to open the upper side of the rear cover 95R. Namely, the front and rear shutters 97F and 97R are interlocked through an interlocking unit 101 so that they oppositely operate.

In more detail, upper and lower parts of the left and right guide supports 81L and 81R are each provided with rotatable pulleys 103U and 103L. Around the upper and lower pulleys 103U and 103L, an endless member 105 such as a timing belt is stretched. To turn the left and right endless members 105 in synchronization, the left and right lower pulleys 103L are integrally connected to each other through an interlocking shaft 107 that elongates in the left-right direction.

The front shutter 97F is connected to a front member 105F of each endless member 105 through a front L-shaped connection bracket 111F that is passed through a long hole 109 to move up and down. The long hole 109 is formed in each of the guide supports 81L and 81R and elongates in the up-down direction. Similarly, the rear shutter 97R is connected to a rear part 105R of each endless member 105 through a rear L-shaped connection bracket 111R. Accordingly, if the front shutter 97F is moved up, the rear shutter 97R moves down through the endless member 105.

The structure for interlocking the front and rear shutters 97F and 97R with each other to oppositely carry out open and close actions is not limited to the above-mentioned one. Any other structure is acceptable. For example, the front and rear shutters 97F and 97R may be moved up and down with separate fluid pressure cylinders with upper or lower cylinder chambers of the cylinders being communicating with each other through a fluid path.

To smoothly move the front and rear shutters 97F and 97R in the up-down direction, the weights of the front and rear shutters 97F and 97R are set to be substantially equal to each other. A rear face of the rear shutter 97R is provided with a handle 113 to move the front and rear shutters 97F and 97R up and down. After the front and rear shutters 97F and 97R are moved up and down, the endless member 105 is fixed to be immobile. For this, an end of the interlocking shaft 107 is provided with an electromagnetic brake 115 (refer to FIG. 8). A control switch 117 to turn on and off the electromagnetic brake 115 is arranged on the handle 113.

When the handle 113 is held and the control switch 117 is operated to turn off the electromagnetic brake 115, the front and rear shutters 97F and 97R are movable up and down. When the control switch 117 is operated to turn on the electromagnetic brake 115, the front and rear shutters 97F and 97R are fixed to be immobile. In this way, the front and rear shutters 97F and 97R are moved up and down to keep the area above the front cover 95F or the rear cover 95R in an open state or a closed state.

As is already understood, when the area above the front cover 95F is open, the area above the rear cover 95R is closed with the rear shutter 97R. In this case, the attaching, detaching, and changing of the punches P and dies D with respect to the tool support beams 83 of the frame 87 are carried out from the front side. On the other hand, when the area above the rear cover 95R is open and the area above the front cover 95F is closed with the shutter 97F, the attaching, detaching, and changing of the punches P and dies D with respect to the tool support beams 83 are carried out from the rear side.

Figure 10:
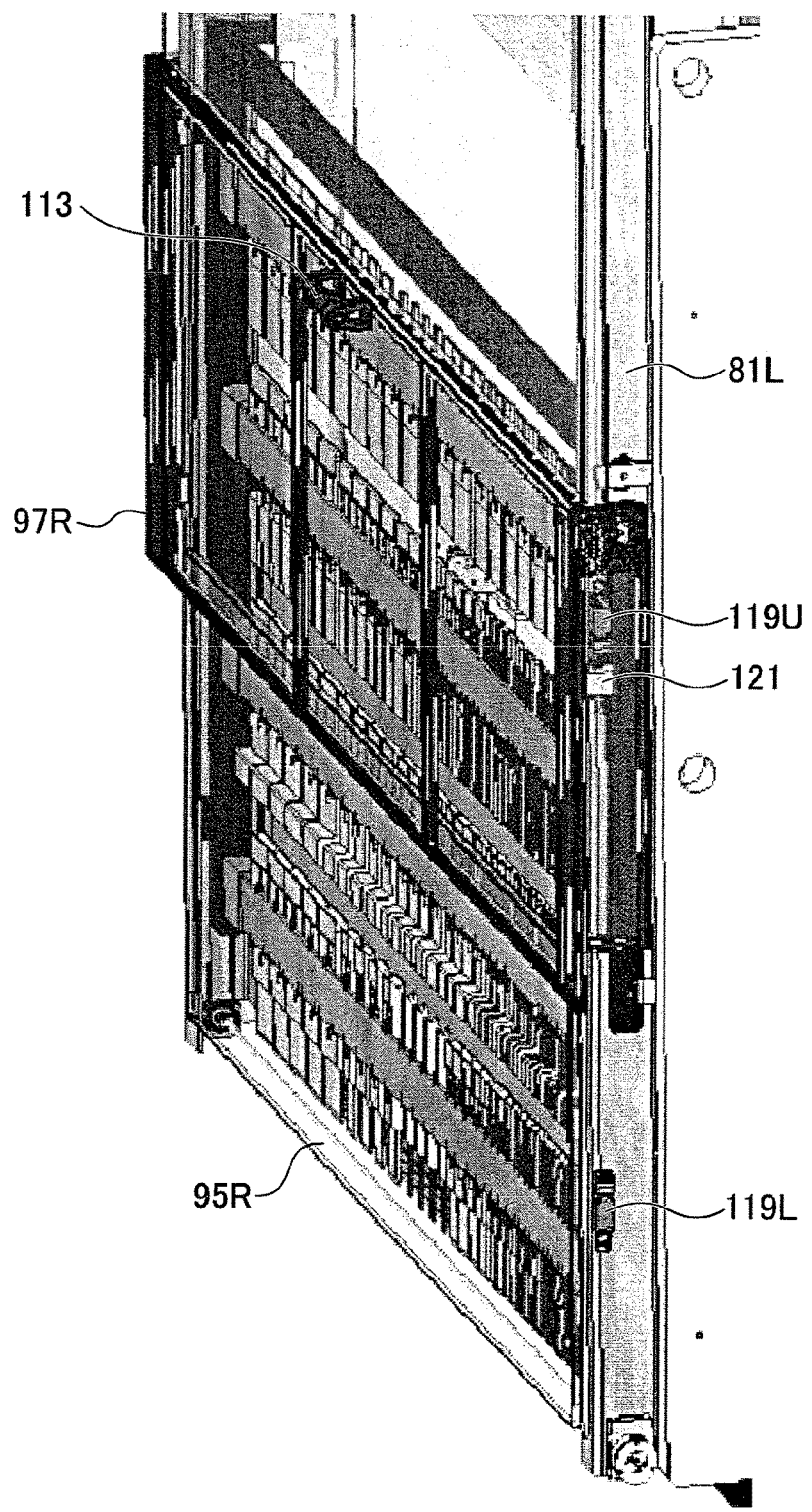
FIG. 10 is an explanatory perspective view illustrating the back of the tool stocker.

As mentioned above, when the front and rear shutters 97F and 97R are moved up and down, the rear shutter 97R closes, if moved up, the area above the rear cover 95R, and if moved down, opens the area. To detect the open and closed states, upper and lower open/close confirming sensors 119U and 119L (refer to FIG. 10) are arranged. The sensors 119U and 119L are, for example, limit switches and are arranged on the guide support 81L away from each other in the up-down direction. The rear shutter 97R is provided with a dog 121 to activate the sensors 119U and 119L.

When the shutter 97R ascends and the dog 121 activates the sensor 119U, it is confirmed that the rear shutter 97R has ascended and the front shutter 97F has descended. Then, the tool changing apparatus 79 is able to attach, detach, and change the punches P and dies D. On the other hand, if the shutter 97R descends and the dog 121 activates the sensor 119L, it is confirmed that the rear shutter 97R has descended and the front shutter 97F has ascended. In this case, the tool changing apparatus 79 is unable to attach, detach, or change the punches P and dies D and it is possible to change the punches P and dies D from the rear side of the tool stocker 77. Accordingly, a configuration may be made to interlock the tool changing apparatus 79 when the upper sensor 119U is activated by the dog 121 and release the interlock when the lower sensor 119L is activated. This improves safety.

The tool changing apparatus 79 is arranged in a left and right pair as illustrated in FIG. 5. Although it is preferable to arrange a pair of left and right tool changing apparatuses 79, it is not always necessary to arrange the tool changing apparatus 79 in a pair. It is possible to arrange only one tool changing apparatus 79. The pair of tool changing apparatuses 79L and 79R are left-right symmetrical with each other, and therefore, one of the tool changing apparatuses 79 will be explained. Structural elements of the other tool changing apparatus 79 are represented with like reference marks to omit overlapping explanations.

The left and right tool changing apparatuses 79L and 79R have slide bases 125 that are individually movable in the left-right direction along guide rails 123 that extend in the left-right direction between the left and right side frames 3L and 3R. Each of the slide bases 125 has an actuator (not illustrated) such as a servomotor or a linear motor. The actuators are individually controlled to individually move and position the slide bases 125.

Each of the slide bases 125 has a guide rail 125G extending in the front-rear direction. Each of the guide rails 125G has a slide support 127 that elongates in the up-down direction and is individually moved and positioned in the front-rear direction. The moving and positioning of the slide support 127 in the front-rear direction are carried out by individually controlling an actuator (not illustrated) provided for the slide support 127.

Each of the slide supports 127 has an up/down support 129 that is movable in the up-down direction and is able to be positioned at a proper height. The up/down support 129 is moved up and down by an up/down actuator (not illustrated) made of a ball screw or the like turned by, for example, a fluid pressure cylinder or a servomotor. The up/down actuators are individually controlled to individually move the up/down supports 129 and position them at proper heights.

Figure 11A:
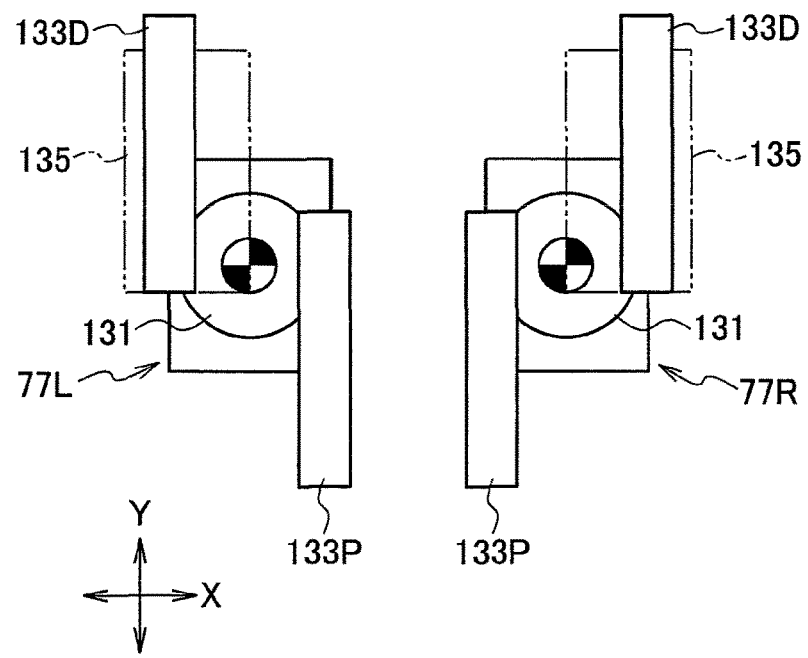
FIG. 11A is an explanatory plan view schematically illustrating operation of a tool changing apparatus according to a first embodiment.
Figure 11B:
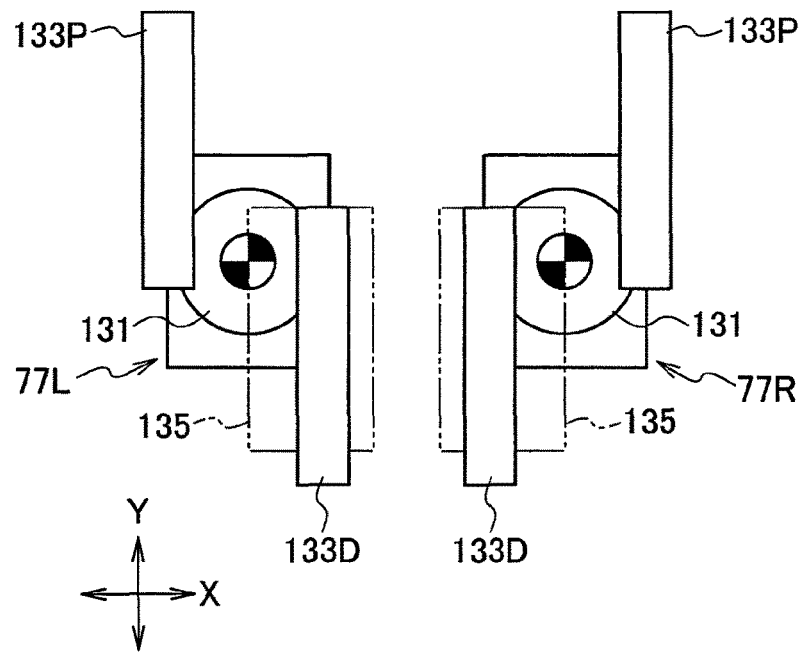
FIG. 11B is an explanatory plan view schematically illustrating operation of a tool changing apparatus according to a first embodiment.

As schematically illustrated in a plan view of FIG. 11, each of the up/down support 129 has a pivot 131 that horizontally turns around an axis extending in the up-down direction. An upper end of the pivot 131 is provided with a punch holding unit (tool holding unit) 133P to hold a punch P and a die holding unit (tool holding unit) 133D to hold a die D. The pivot 131 is also provided with a work contact member (back gauge) to position, in the front-rear direction, a work to be bent with the punch P and die D.

As illustrated in FIG. 11, the punch holding unit 133P and die holding unit 133D, i.e., the tool holding units are arranged at positions deviated from the axis of the pivot 131.

The punch holding unit 133P and die holding unit 133D are arranged at symmetrical positions with respect to the axis of the pivot 131. More precisely, the punch holding unit 133P and die holding unit 133D are deviated from the pivot 131 so that, when they are turned and positioned to face frontward (downward in FIG. 11) in the direction of the upper and lower tables 5 and 7, they can be brought into contact with each other in the left-right direction (X-axis direction).

When split tools (punches P or died D) are taken out of the tool stocker 77 and are attached to the tool attaching units 9 and 13 of the upper and lower tables 5 and 7, the split tools taken by the left and right tool changing apparatuses 79L and 79R can be attached into a contacted state.

Figure 12:
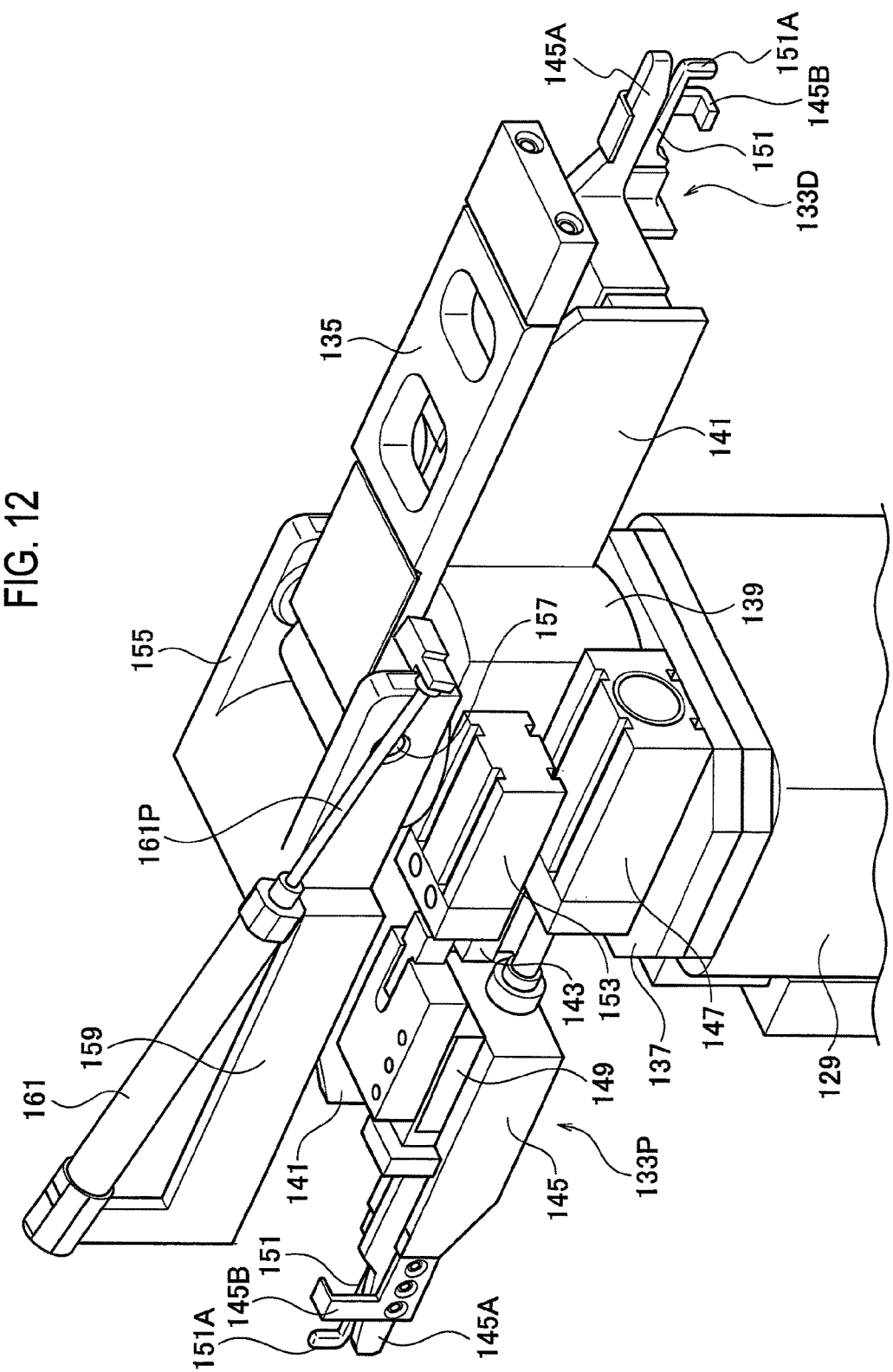
FIG. 12 is an explanatory perspective view illustrating a tool holding unit of the tool changing apparatus.

Installed states of the punch holding unit 133P, die holding unit 133D, and back gauge (work contact member) 135 onto the pivot 131 are illustrated in detail in FIG. 12. The pivot 131 (not illustrated in FIG. 12) is horizontally rotatably installed in the up-down support 129. On a top face of the pivot 131, a pivot base 137 is integrally arranged. At symmetrical positions around a pivot center of the pivot base 137, the punch holding unit 133P and die holding unit 133D are arranged.

The punch holding unit 133P and die holding unit 133D are constituted similar to the upper-tool changing apparatus 37U and lower-tool changing apparatus 37L of the related art mentioned above. The punch holding unit 133P and die holding unit 133D are formed to be up-down symmetrical. Accordingly, the structure of the punch holding unit 133P will be explained and like elements of the die holding unit 133D are represented with like reference marks to avoid overlapping explanations.

Arranged on the pivot base 137 is a pedestal 139 protruding upward. The pedestal 139 has support wall members 141 that horizontally extend in opposite directions. One of the support wall members 141 is provided with the punch holding unit 133P. Namely, the support wall member 141 has a guide member 143 corresponding to the guide member 53 mentioned above. The guide member 143 movably supports a hook support member 145 corresponding to the hook support member 59 mentioned above. The hook support member 145 has a front end part 145A and projection part 145B corresponding to the front end part 59A and upward projection 59B mentioned above. As an actuator to move the hook support member 145 front and rear, a front-rear actuator 147 corresponding to the front-rear actuator 61 mentioned above is arranged on the pivot base 137.

Arranged to reciprocate on a top face of the hook support member 145 is a hook attaching member 149 corresponding to the hook attaching member 63 mentioned above. The hook attaching member 149 has a hook member 151 that corresponds to the hook member 69 mentioned above and is pivotable up and down. The hook member 151 has an upward projection 151A. A front-rear actuator 153 corresponding to the front-rear actuator 65 mentioned above is arranged on the support wall member 141. The other support wall member 141 has the die holding unit 133D.

Arranged on the pedestal 139 is the back gauge (work contact member) 135 that is swingable upward. Namely, arranged on the pedestal 139 is a U-shaped bracket 155. The bracket 155 has a horizontal pivot 157 that is orthogonal to the moving direction of the hook support member 145 of the punch holding unit 133P. The pivot 157 supports the back gauge 135 that is upwardly swingable from a horizontal state.

To swing the back gauge 135 up and down, the bracket 155 has an L-shaped support bracket 159. The support bracket 159 has a fluid pressure cylinder 161 as an example of a swing actuator to swing the back gauge 135 up and down. The fluid pressure cylinder 161 has a reciprocable piston rod 161P whose front end is properly connected to the back gauge 135.

With the above-mentioned configuration, the swing actuator 161 operates to swing the back gauge 135 upward from a horizontal state. When the die holding unit 133D attaches, detaches, or changes a die D, the die D never interferes with the back gauge 135.

As is already understood, the punch holding unit 133P and die holding unit 133D of the left and right tool changing apparatuses 79L and 79R are moved and positioned in the left-right direction (X-axis direction), front-rear direction (Y-axis direction), and up-down direction (Z-axis direction), and in addition, are pivotable in the front-rear direction. Accordingly, the punch P and die D are able to be attached, detached, and changed between the tool stocker 77 and the tool attaching units 9 and 13 of the upper and lower tables 5 and 7.

While the punch P and die D attached to the upper and lower tables 5 and 7 are bending a work, the inner side (front side) of the tool stocker 77 is closed with the front shutter 97F and the outer side (rear side) of the tool stocker 77 is opened as mentioned above. Accordingly, the punch P and die D are able to be attached, detached, and changed from behind the tool stocker 77.

As mentioned above, a work to be bent is positioned in the front-rear direction by bringing the work into contact with the back gauge 135 provided for each of the left and right tool changing apparatuses 79L and 79R.

When a work is bent with the punch P and die D, there is an occasion to bend the work after inverting the rear side of the punch P to front. To invert the rear side of the punch P to front, the embodiment employs a temporary tool holding unit 163 for temporarily holding the punch P. More precisely, as illustrated in FIG. 5, upper parts of the side frames 3L and 3R support left and right ends of a beam member 165 serving as a ceiling member. A bottom face of the beam member 165 is provided with the temporary tool holding unit 163.

The temporary tool holding unit 163 is at an intermediate position in a moving path of the tool changing apparatuses 79L and 79R that move in the front-rear direction between the tool stocker 77 and the upper and lower tables 5 and 7 in the press brake 75. The temporary tool holding unit 163 has a tool holding beam 169 that is horizontally attached to lower ends of supports 167 that are vertically extended from the beam member 165. Formed in a bottom face of the tool holding beam 169 is a tool attaching groove 169G corresponding to the tool attaching groove 11. The pressing-fixing piece 31 is omitted from the tool attaching groove 169G.

According to the above-mentioned configuration, the punch holding unit 133P of each of the tool changing apparatuses 79L and 79R removes a punch P from the tool stocker 77, transfers the same to the upper-tool attaching unit 9 of the upper table 5 in the press brake 75, and attaches the same thereto. At this time, the punch holding unit 133P is kept to be oriented rearward and the punch P is temporarily attached to the tool attaching groove 169G of the tool holding beam 169. Thereafter, the punch holding unit 133P is turned to face forward so as to hold, from the rear side, the punch P temporarily held in the tool attaching groove 169G. The punch holding unit 133P is kept to face forward and the punch P is attached to the upper-tool attaching unit 9 of the upper table 5. As a result, the punch P held in the tool stocker 77 is inverted to face forward and is attached to the upper table 5. Namely, the punch P is able to be attached to the upper table 5 after inverting the rear side of the punch P to front, or without inverting the same.

As is understood from the above explanation, the embodiment is able to save space for the sheet material bending system as a whole and allows individual tools to be easily attached, detached, and changed with respect to the tool stocker 77 from the outside. In the above explanation, the tool stocker 77 is arranged between the left and right side frames 3L and 3R of the press brake 75. Instead, the tool stocker 77 may be arranged behind the left and right side frames 3L and 3R.

Figure 13A:
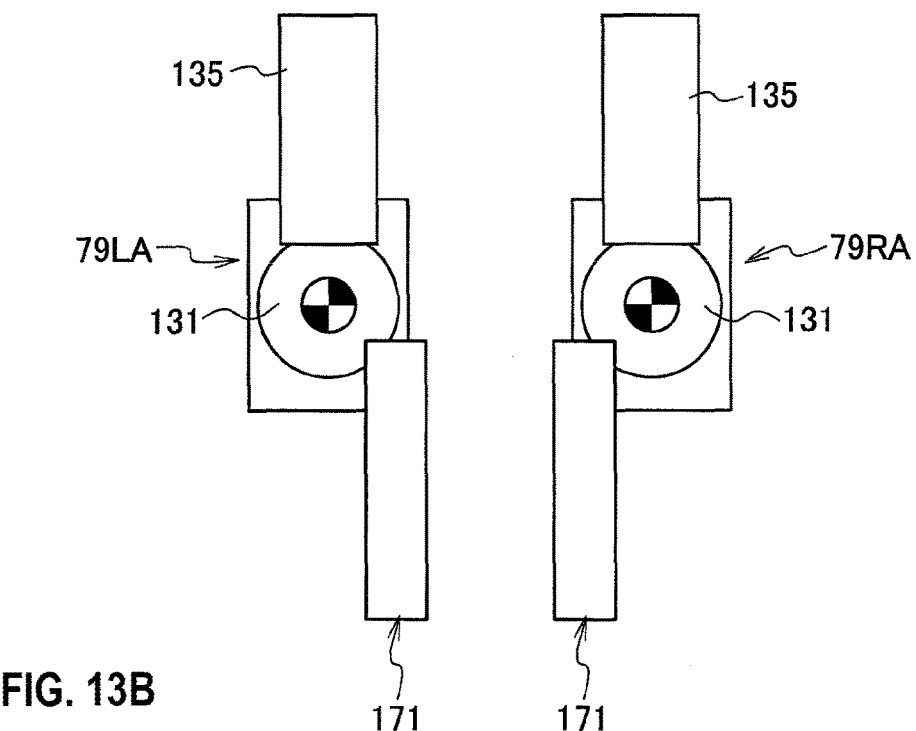
FIG. 13A is an explanatory plan view schematically illustrating operation of a tool changing apparatus according to a second embodiment.
Figure 13B:
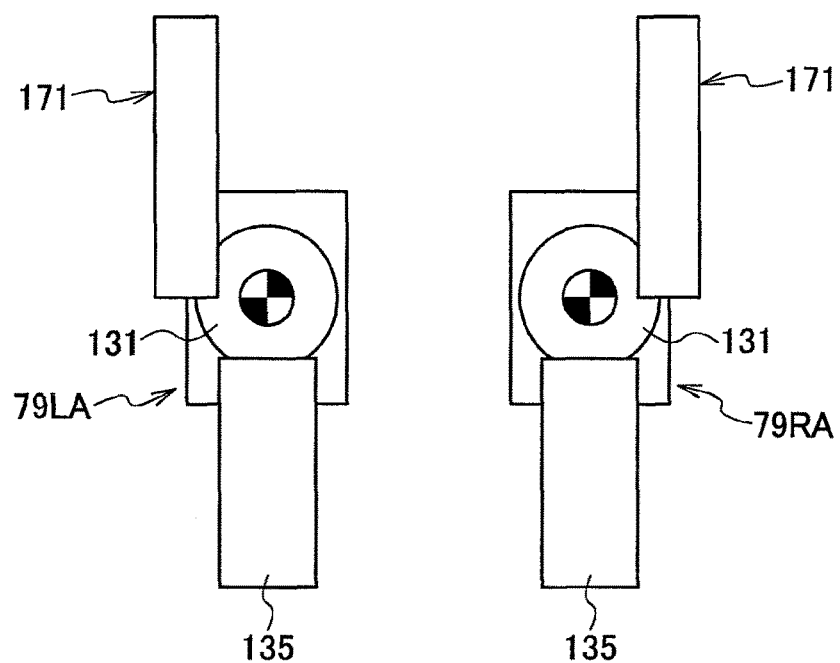
FIG. 13B is an explanatory plan view schematically illustrating operation of a tool changing apparatus according to a second embodiment.

FIG. 13 is a schematic plan view illustrating the second embodiment of the tool changing apparatuses 79L and 79R. The tool changing apparatuses 79LA and 79RA according to the second embodiment each integrate the punch holding unit 133P and die holding unit 133D into one. Namely, the second embodiment provides the pivot 131 with a back gauge 135 and an upper/lower-tool holding unit 171 that is able to handle both a punch (upper tool) P and a die (lower tool) D.

When the upper/lower-tool holding unit 171 of this configuration holds a tool, i.e., a punch P or a die D, the tool and back gauge 135 must not interfere with each other. For this, the upper/lower-tool holding unit 171 and back gauge 135 are so arranged on the pivot 131 that front ends of the upper/lower-tool holding unit 171 and back gauge 135 face different directions, i.e., opposite directions. It is sufficient if the back gauge 135 does not interfere with the tool P or D when the upper/lower-tool holding unit 171 holds the tool P or D. Accordingly, the direction of the front end of the back gauge 135 is satisfactory if it differs from the direction of the front end of the upper/lower-tool holding unit 171.

Figure 14:
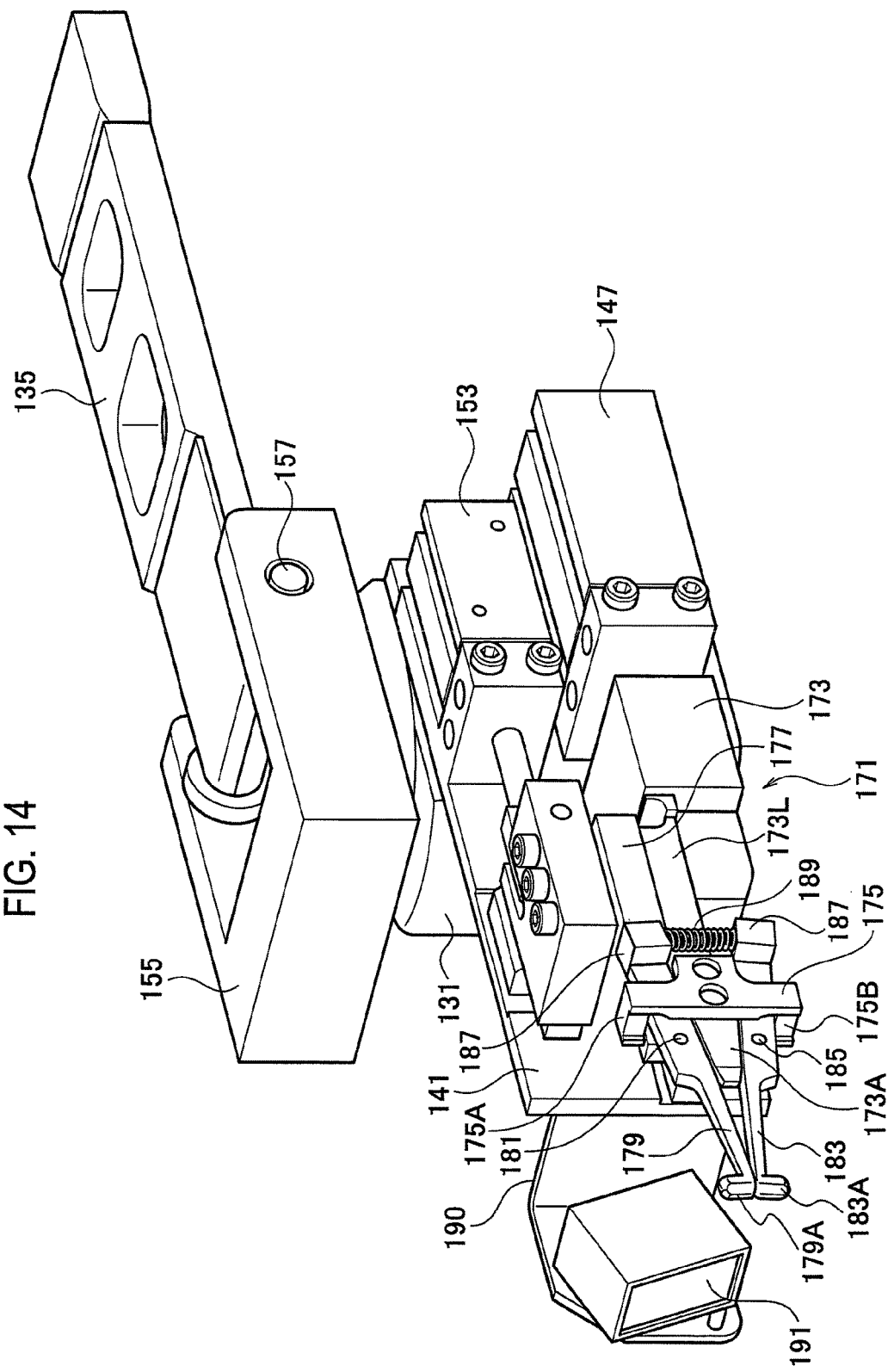
FIG. 14 is an explanatory perspective view illustrating the tool changing apparatus according to the second embodiment.
Figure 15:
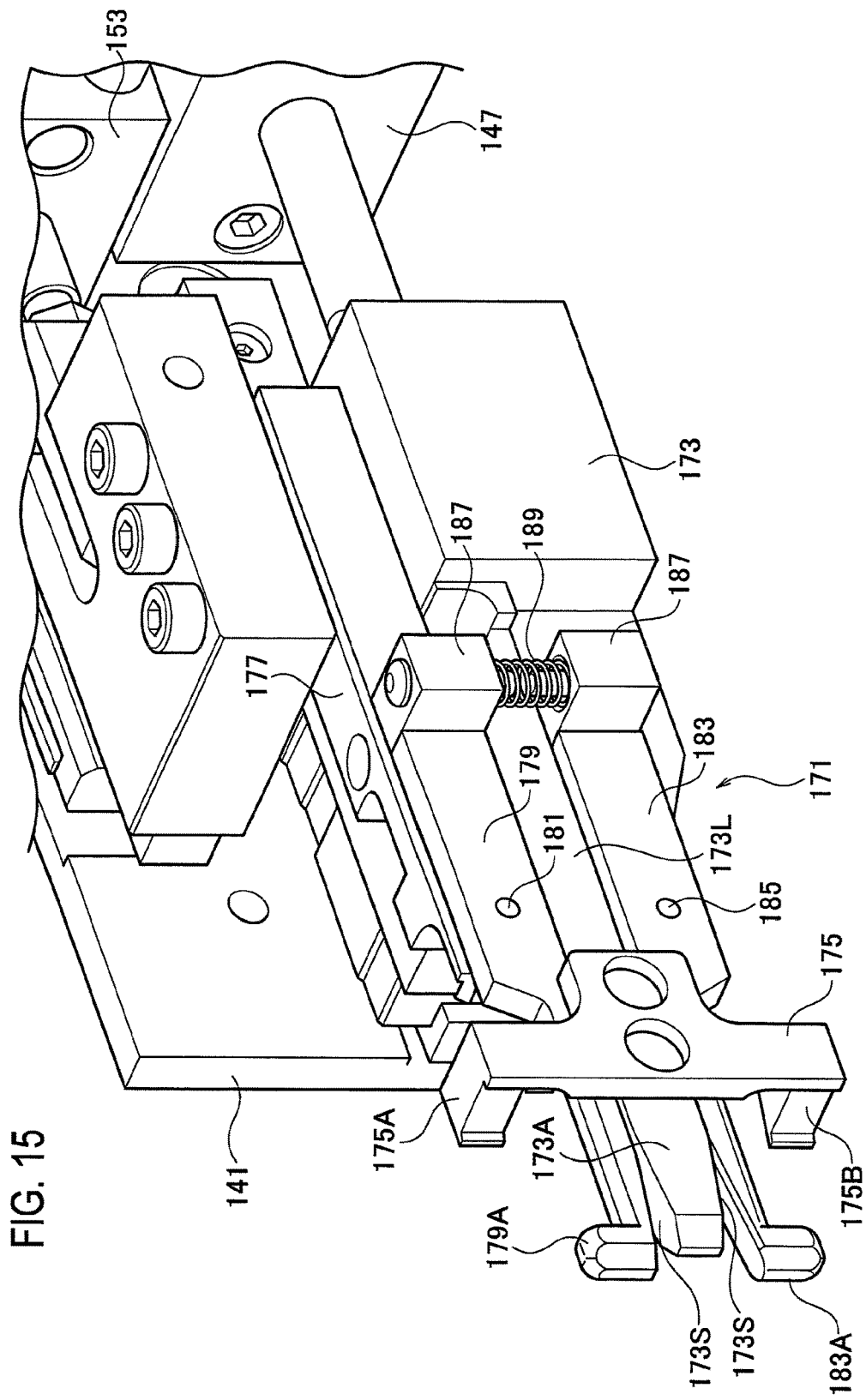
FIG. 15 is an explanatory perspective view illustrating essential part of the tool changing apparatus according to the second embodiment.

The upper/lower-tool holding unit 171 is structured as illustrated in FIGS. 14 and 15. Namely, a side face of a support wall member 141 integrally attached to the pivot 131 is provided with a hook support member 173 that is moved front and rear by a front-rear actuator 147. The hook support member 173 corresponds to the hook support member 145 mentioned above. An upward/downward projecting member 175 corresponding to the projection 145B mentioned above is integrally attached with a fixing member such as a bolt to a position close to a front end 173A of a long extended part 173L.

Figure 16:
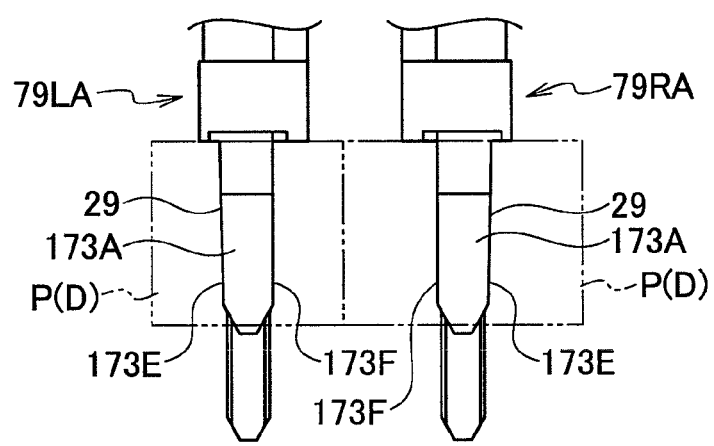
FIG. 16 is an explanatory view illustrating essential part of the tool changing apparatus.

The upward/downward projecting member 175 has an upward projection 175A that is positioned above the front end 173A and a downward projection 175B that is positioned below the same. A slant face 173S is formed on each of top and bottom faces of the front end 173A of the extended part 173L of the hook support member 173 in an area in front of the upward/downward projecting member 175. In the left and right tool changing apparatuses 79LA and 79RA, opposing faces 173F (refer to FIG. 16) of the front ends 173A of the hook support members 173 are formed into vertical faces. Side faces 173E opposite to the opposing faces 173F are formed into slant faces.

Accordingly, the front ends 173A of the hook support members 173 are easily insertable into the through holes 29 of the tools P or D. In addition, when the tool is inserted into the through hole 29, this structure is able to reduce a clearance between the front end 173A and the through hole 29, thereby ensuring a position where the hook support member 173 holds the tool P or D. As a result, the tools P or D are brought into contact with each other in the left-right direction at correct positions.

In the upper/lower-tool holding unit 171, a side face of the support wall member 141 is provided with a front-rear actuator 153 corresponding to the front-rear actuator 153 mentioned above. The front-rear actuator 153 moves a hook attaching member 177 front and rear. The hook attaching member 177 has a pivot 181 that supports a longitudinal intermediate part of an upper hook member (upper finger) 179 corresponding to the hook member 151. With the pivot 181, the upper hook member 179 is pivotable up and down. The hook attaching member 177 also has a pivot 185 that supports an intermediate part of a lower hook member (lower finger) 183 so that the lower hook member 183 may pivot up and down.

The upper hook member 179 is arranged above the extended part 173L of the hook support member 173 and the lower hook member 183 is arranged below the extended part 173L. A front end of the upper hook member 179 has an upward projection 179A projecting upward and the lower hook member 183 has a downward projection 183A.

A base end of each of the upper and lower hook members 179 and 183 has a spring seat 187. Arranged between the spring seats of the upper and lower hook members 179 and 183 is a resilient member 189 such as a coil spring to always bias the front ends of the hook members 179 and 183 toward each other. Accordingly, the pressing force of the resilient member 189 brings the front ends of the upper and lower hook members 179 and 183 into contact with each other in a normal state.

In the upper/lower-tool holding unit 171, another side face of the front end of the support wall member 141 has a bracket 190 that supports an identification reading unit 191. The identification reading unit 191 reads an identifier such as a barcode on a tool P or D. When the tool stocker 77 stores a plurality of tools P and D, the identification reading unit 191 is positioned to a height of tools P and D supported by any one of the tool support beams 83 and the slide base 125 is moved in the X-axis direction so that the identification reading unit 191 reads identifiers of the tools P and D.

A moving position of the slide base 125 in the X-axis direction is read by a position detecting unit (for example, a rotary encoder on a servomotor). A height of the tool support beam 83 is read by a height detecting unit (such as a rotary encoder provided for the servomotor for moving the up/down support 129 in the up-down direction). These detecting units detect a moving position in the X-axis direction of the upper/lower-tool holding unit 171 and an up-down moving position of the same. The X-axis and up-down positional data are related to the identification data of each tool P or D read by the identification reading unit 191 and the related data are stored in a memory of a control apparatus (not illustrated). The stored data enable the management of the plurality of tools P and D stored in the tool stocker 77.

Figure 17A:
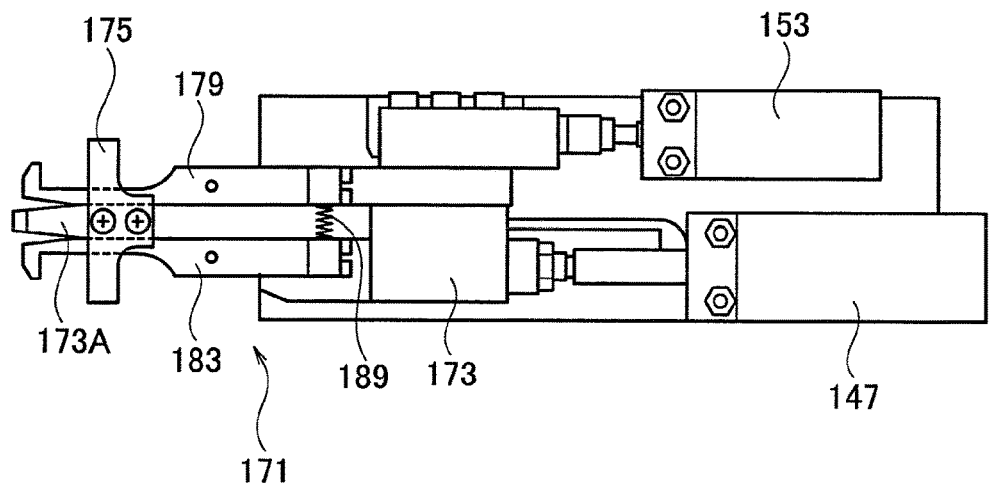
FIG. 17A is an explanatory view illustrating operation of the tool changing apparatus.

In the upper/lower-tool holding unit 171 illustrated in FIG. 17(A), the front end 173A of the hook support member 173 is moved to the front ends of the upper and lower hook members 179 and 183. In this state, the upper and lower hook members 179 and 183 are kept to be substantially parallel with each other. When the front end 173A of the hook support member 173 is retracted, the action of the resilient member 189 brings the front ends of the upper and lower hook members 179 and 183 closer to each other (refer to FIG. 17(B)).

Figure 17B:
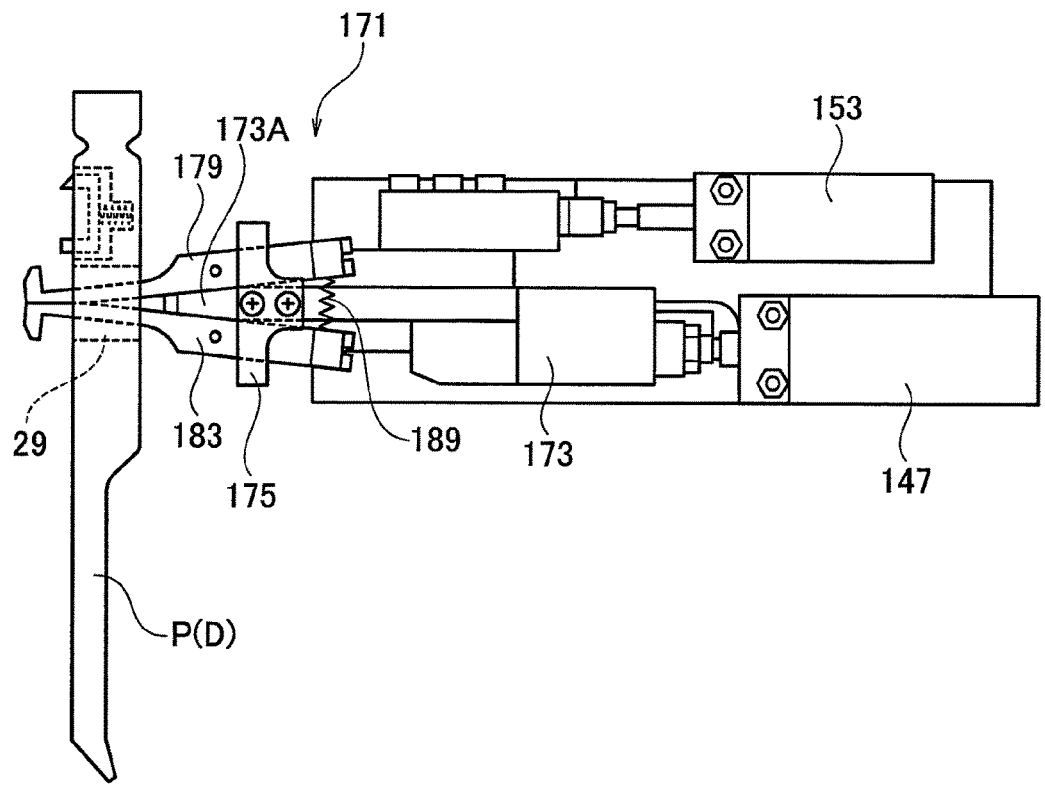
FIG. 17B is an explanatory view illustrating operation of the tool changing apparatus.

When the front ends of the upper and lower hook members 179 and 183 come close to each other as mentioned above, the front ends of the upper and lower hook members 179 and 183 are inserted into the through hole 29 of the tool P or D (refer to FIG. 17(B)). Thereafter, the front end 173A of the hook support member 173 is pushed between the front ends of the upper and lower hook members 179 and 183.

Figure 18A:
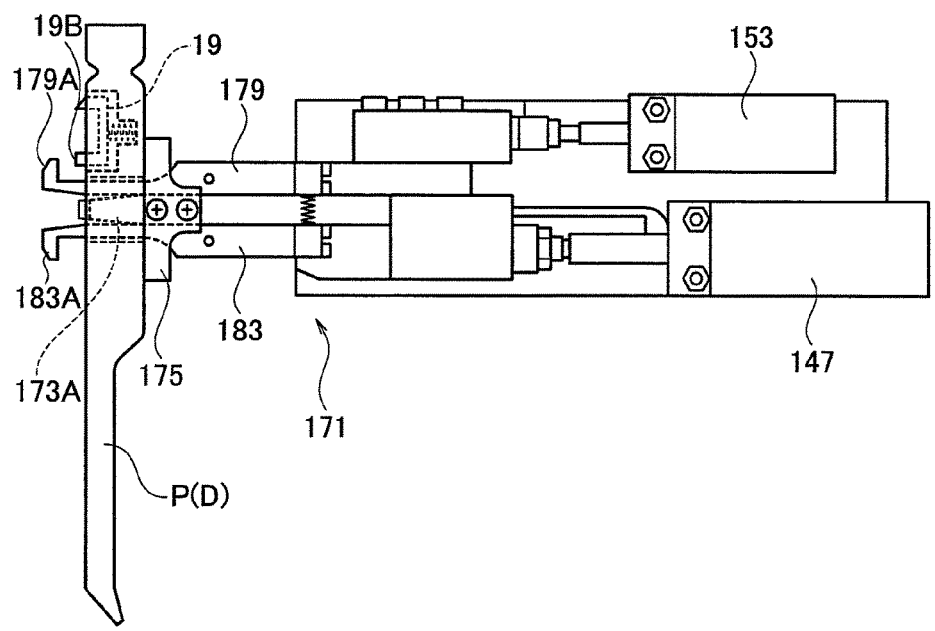
FIG. 18A is an explanatory view illustrating operation of the tool changing apparatus.
Figure 18B:
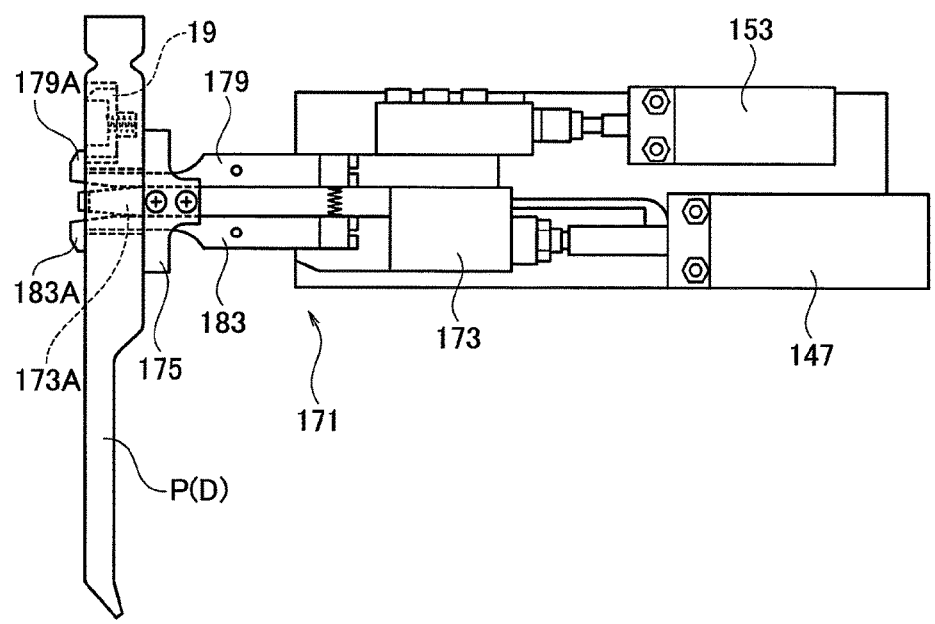
FIG. 18B is an explanatory view illustrating operation of the tool changing apparatus.

Then, the upward/downward projecting member 175 of the hook support member 173 comes into contact with the tool P or D and the front ends of the upper and lower hook members 179 and 183 are separated from each other (refer to FIG. 18(A)).

Thereafter, the front-rear actuator 153 is activated to move the upper and lower hook members 179 and 183 in a pull-out direction of the through hole 29. Then, one of the upper projection 179A and lower projection 183A of the upper and lower hook members 179 and 183 presses the push button 19B of the stop piece 19 of the tool P or D. As a result, the tool P or D is able to be released from the tool attaching groove 11 of a corresponding one of the upper- and lower-tool attaching units 9 and 13.

As is already understood, the upper/lower tool holding unit 171 is able to handle upper and lower tools P and D. There is no need of separately preparing the punch holding unit 133P and die holding unit 133D, thereby simplifying the general structure of the system.

Figure 19:
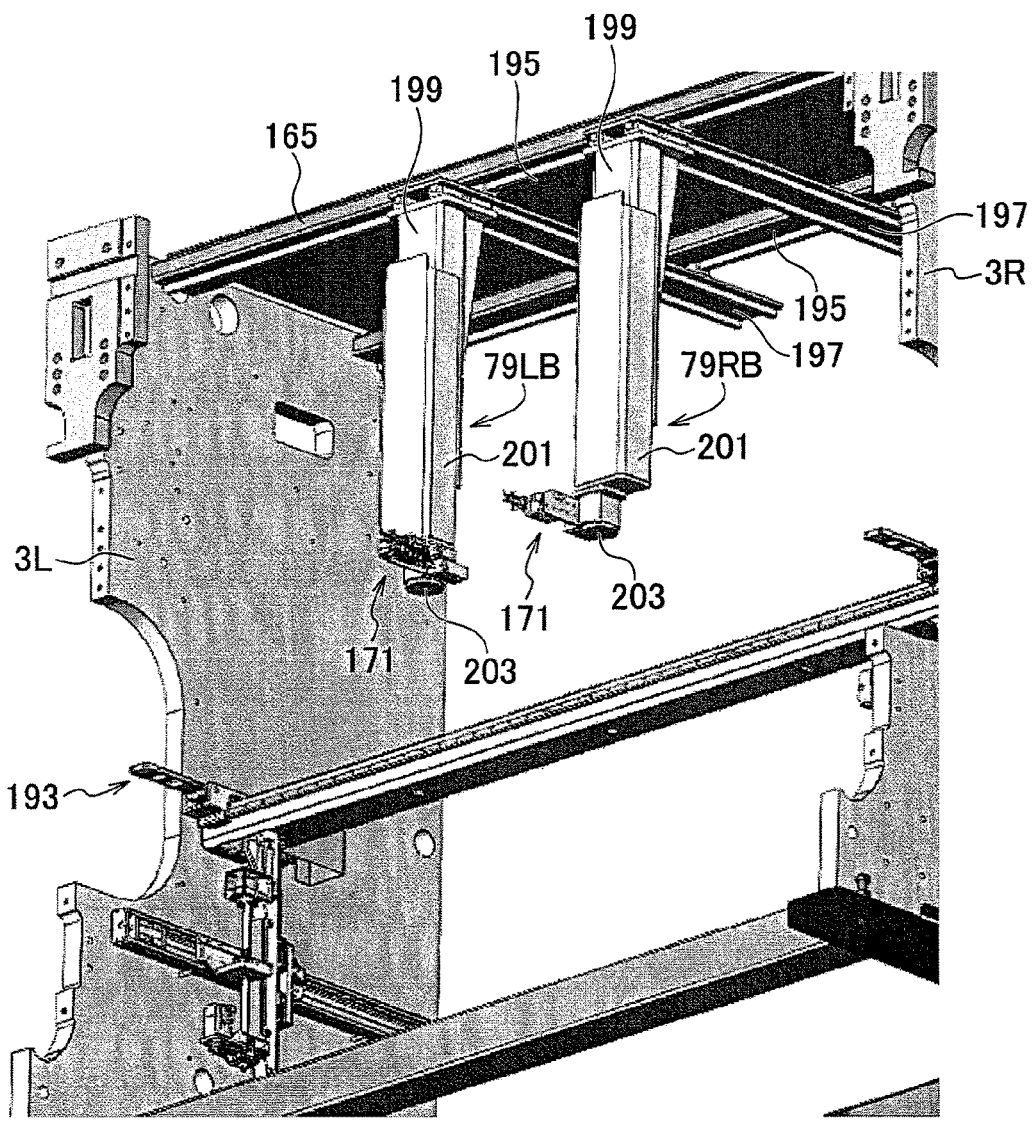
FIG. 19 is an explanatory perspective view illustrating a tool changing apparatus according to a third embodiment.

FIG. 19 is an explanatory view illustrating a sheet material bending system according to the third embodiment of the present invention. The sheet material bending system according to this embodiment provides a general press brake having a back gauge 193, which is moved and positioned in the front-rear and left-right directions, with tool changing apparatuses 79LB and 79RB at lower part (on a bottom face) of a beam member 165 whose left and right sides are supported at upper part of left and right side frames 3L and 3R of the press brake.

Namely, the tool changing apparatuses 79LB and 79RB have a pair of slide bases 197 that are arranged on guide rails 195 extending in the left-right direction on the bottom face of the beam member 165 and are moved and positioned in the left-right direction. The slide base 197 has a vertical slide support 199 that is moved and positioned in the front-rear direction. The slide support 199 has an up/down support 201 that is movable up and down. A lower end of the up/down support 201 has a pivot 203 that is horizontally rotatable and has the upper/lower tool holding unit 171 mentioned above.

This structure corresponds to a structure with the tool changing apparatuses 79L and 79R turned upside down and arranged on the bottom face of the beam member 165. Accordingly, this structure is able to attach, detach, and change tools P and D between the tool stocker 77 arranged behind the press brake and the tool attaching units 9 and 13 of the upper and lower tables 5 and 7. This structure is easily realized by providing a general press brake with the beam member 165 and tool stocker 77 afterward.

FIG. 20 illustrates another embodiment of the tool changing apparatuses 79LB and 79RB. The tool changing apparatuses 79LC and 79RC illustrated in FIG. 20 have each a tool holding unit 205 at a lower end of an up/down support 201, the tool holding unit 205 being capable of handling an upper tool and a lower tool. More precisely, the lower end of the up/down support 201 of each of the tool changing apparatuses 79LC and 79RC has a rotary actuator 207L (207R) such as a servomotor.

Each of the rotary actuators 207L and 207R has a rotary shaft extending in the left-right direction. At each of facing ends of the rotary shafts, an L-shaped rotary bracket 209L (209R) is arranged. Each of the rotary brackets 209L and 209R has a rotary actuator 211L (211R (not illustrated)) having a rotary shaft that is orthogonal to the rotary shaft of the rotary actuator 207L (207R).

The rotary shaft of each of the rotary actuators 211L and 211R is integrally provided with a rotary support member 213L (213R). Each of the rotary support members 213L and 213R is provided with the tool holding unit 205 that has the same structure as the punch holding unit 133P or the die holding unit 133D. Since the tool holding unit 205 has the same structure as the punch holding unit 133P or the die holding unit 133D, FIG. 20 schematically illustrates the tool holding unit 205 without details.

In the above-mentioned configuration, the rotary actuator 207L (207R) turns the rotary bracket 209L (209R). Then, a front end of the rotary support member 213L (213R) supported by the rotary bracket 209L (209R) is able to be oriented toward the rear and a rear end thereof toward the front. If the rotary actuator 211L (211R) turns the rotary support member 213L (213R), the tool holding unit 205 provided for the rotary support member 213L (213R) is turned upside down.

In this way, turning the tool holding unit 205 upside down results in switching the tool holding unit 205 between a state to deal with an upper tool (punch) P and a state to deal with a lower tool (die) D, thereby handling both the upper and lower tools P and D.

Figure 20A:
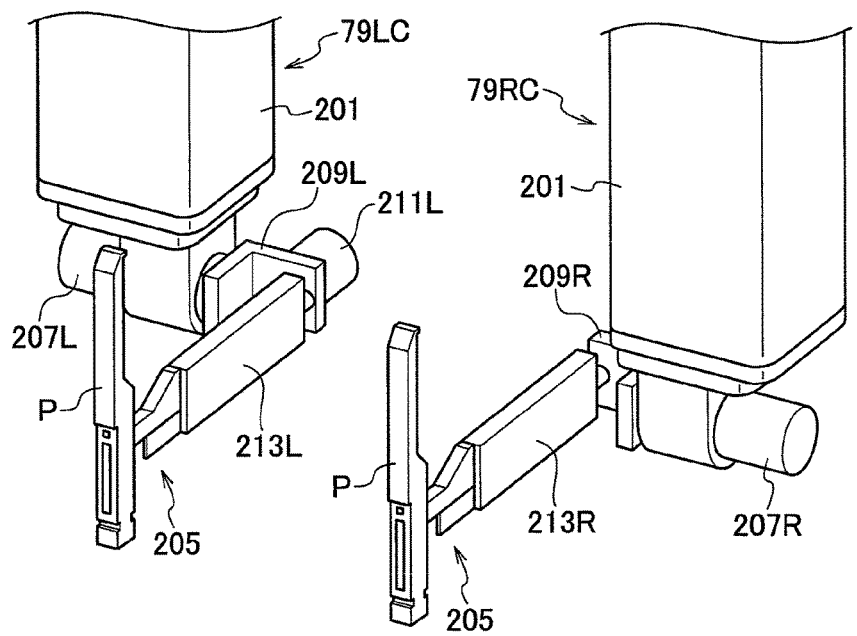
FIG. 20A is an explanatory perspective view illustrating a tool changing apparatus according to a fourth embodiment.

The front end of the rotary support member 213L (213R) is oriented toward the rear to pick up a tool from the tool stocker 77, and thereafter, the rotary support member 213L (213R) is oriented to the front as illustrated in FIG. 20(A). This results in turning the picked-up tool P upside down. The rotary actuator 211L (211R) is driven to turn the rotary support member 213L (213R) upside down, so that the tool P is turned upside down to restore the original state (refer to FIG. 20(B)).

Figure 20B:
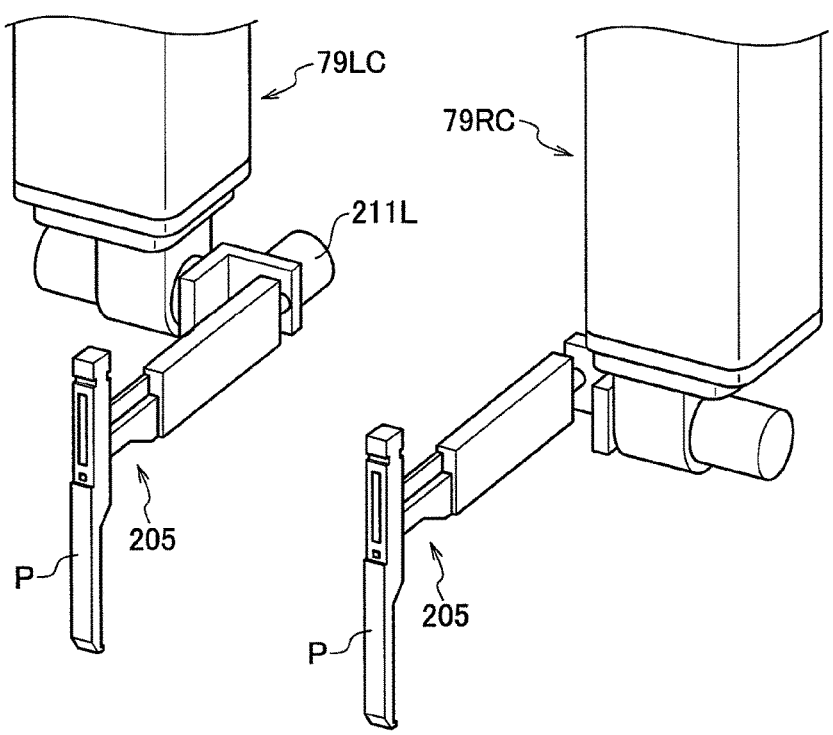
FIG. 20B is an explanatory perspective view illustrating a tool changing apparatus according to a fourth embodiment.

As is already understood, holding the tool P as illustrated in FIG. 20(A) in the above-mentioned configuration enables the tool P to be attached to and detached from the lower table 7. Turning the tool P upside down as illustrated in FIG. 20(B) enables the tool P to be attached to and detached from the upper table 5. This configuration also eliminates the need of separately preparing the punch holding unit 133P and die holding unit 133D, thereby simplifying the system as a whole.

In the above explanation, the tool changing apparatuses 79LC and 79RC are vertically hung from the beam member 165. It is also possible to configure the punch holding unit 133P illustrated in FIG. 11 so that it is able to be inverted front and rear and up and down like the tool holding unit 205 illustrated in FIG. 20, to eliminate the die holding unit 133D.

The present invention is able to simplify the system as a whole and save space. When the tool changing apparatus is changing a tool with respect to the press brake, or when a work is being bent by the press brake, the present invention is able to manually change tools with respect to the tool stocker from behind the tool stocker. Accordingly, the present invention is able to improve the efficiency of tool preparation work.

(United States Designation)

In connection with United States designation, this international patent application claims the benefit of priority under 35 U.S.C. 119(a) to Japanese Patent Application No. 2012-231422 filed on Oct. 19, 2012 whose disclosed contents are cited herein.

What is claimed is:

1. A sheet material bending system comprising:
a press brake that has an upper table at a front upper part of left and right side frames and a lower table at a front lower part of the left and right side frames;
a tool stocker that detachably stores a plurality of upper and lower tools to be at least one of attached, detached and changed with respect to the press brake, the plurality of upper tools being associated with the upper table and the plurality of lower tools being associated with the lower table;
a tool changing apparatus that changes tools, among the plurality of upper and lower tools, between the press brake and the tool stocker,
wherein the tool stocker is arranged behind the press brake, and front and rear sides of the tool stocker are opened so that tools are accessible from the front and rear sides of the tool stocker, and wherein the tool changing apparatus is configured to attach, detach and change the tools with respect to the tool stocker from the front side of the tool stocker, wherein
the tool changing apparatus has a pivot that is movable in front-rear, left-right, and up-down directions and the pivot is rotatable around an axis extending in the up-down direction, and an axial end of the pivot being provided with a tool holding unit to hold a tool, among the tools, and the pivot is arranged on a bottom face of a beam member that is arranged at the upper part of the left and right side frames.

\* \* \* \* \*